United States Patent
Sychev et al.

(10) Patent No.: US 10,863,205 B2
(45) Date of Patent: *Dec. 8, 2020

(54) ADAPTIVE SHARPENING FILTER FOR PREDICTIVE CODING

(71) Applicant: Huawei Technologies Co., Ltd., Shenzhen (CN)

(72) Inventors: Maxim Borisovitch Sychev, Moscow (RU); Victor Alexeevich Stepin, Moscow (RU); Sergey Yurievich Ikonin, Moscow (RU)

(73) Assignee: Huawei Technologies Co., Ltd., Shenzhen (CN)

(*) Notice: Subject to any disclaimer, the term of this patent is extended or adjusted under 35 U.S.C. 154(b) by 93 days.

This patent is subject to a terminal disclaimer.

(21) Appl. No.: 15/934,628

(22) Filed: Mar. 23, 2018

(65) Prior Publication Data

US 2018/0220162 A1    Aug. 2, 2018

Related U.S. Application Data

(63) Continuation of application No. PCT/RU2015/000612, filed on Sep. 25, 2015.

(51) Int. Cl.
*H04N 19/82* (2014.01)
*H04N 19/13* (2014.01)
(Continued)

(52) U.S. Cl.
CPC ............ *H04N 19/82* (2014.11); *G06T 5/003* (2013.01); *H04N 19/117* (2014.11);
(Continued)

(58) Field of Classification Search
None
See application file for complete search history.

(56) References Cited

U.S. PATENT DOCUMENTS

| 6,175,656 | B1 | 1/2001 | Hoang |
| 7,266,150 | B2 | 9/2007 | Demos |

(Continued)

FOREIGN PATENT DOCUMENTS

| CN | 1663258 A | 8/2005 |
| CN | 103238320 A | 8/2013 |

(Continued)

OTHER PUBLICATIONS

Peng et al. (JCT3V-D0077: "CE6.H related: Results on Modified Binarization for Region Boundary Chain Coding", Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013).*

(Continued)

*Primary Examiner* — Dakshesh D Parikh
(74) *Attorney, Agent, or Firm* — Leydig, Voit & Mayer, Ltd.

(57) ABSTRACT

A video coder is provided for predictive coding, into an encoded video bit stream, of an original block of an original frame based on a prediction block obtained from a reference frame, comprising a buffer configured to store the original block, a buffer configured to store the prediction block, and an adaptive sharpening filter configured to apply a spatial adaptive sharpening filtering to the prediction block.

21 Claims, 8 Drawing Sheets

(51) Int. Cl.
*H04N 19/33* (2014.01)
*H04N 19/14* (2014.01)
*H04N 19/50* (2014.01)
*H04N 19/117* (2014.01)
*H04N 19/176* (2014.01)
*H04N 19/44* (2014.01)
*H04N 19/51* (2014.01)
*G06T 5/00* (2006.01)

(52) U.S. Cl.
CPC .......... *H04N 19/13* (2014.11); *H04N 19/14* (2014.11); *H04N 19/176* (2014.11); *H04N 19/33* (2014.11); *H04N 19/44* (2014.11); *H04N 19/50* (2014.11); *H04N 19/51* (2014.11); *G06T 2207/20201* (2013.01)

(56) References Cited

U.S. PATENT DOCUMENTS

| | | | |
|---|---|---|---|
| 8,705,622 | B2 | 4/2014 | Ye et al. |
| 8,780,971 | B1 | 7/2014 | Bankoski et al. |
| 2002/0063807 | A1 | 5/2002 | Margulis |
| 2003/0194010 | A1 | 10/2003 | Mukerjee et al. |
| 2004/0213470 | A1 | 10/2004 | Sato et al. |
| 2005/0147316 | A1 | 7/2005 | Deshpande |
| 2005/0243913 | A1 | 11/2005 | Kwon et al. |
| 2007/0091997 | A1 | 4/2007 | Fogg et al. |
| 2008/0089417 | A1 | 4/2008 | Bao et al. |
| 2008/0109041 | A1 | 5/2008 | De Voir |
| 2008/0205508 | A1 | 8/2008 | Ziauddin et al. |
| 2009/0257499 | A1 | 10/2009 | Karczewicz et al. |
| 2010/0002770 | A1 | 1/2010 | Motta et al. |
| 2010/0008430 | A1 | 1/2010 | Karczewicz et al. |
| 2010/0053689 | A1 | 3/2010 | Ohwaku et al. |
| 2010/0111182 | A1 | 5/2010 | Karczewicz et al. |
| 2010/0128995 | A1 | 5/2010 | Drugeon et al. |
| 2010/0284458 | A1 | 11/2010 | Andersson et al. |
| 2011/0096236 | A1 | 4/2011 | Ngan et al. |
| 2011/0299604 | A1 | 12/2011 | Price et al. |
| 2011/0317764 | A1 | 12/2011 | Joshi et al. |
| 2012/0170650 | A1 | 7/2012 | Chong et al. |
| 2012/0200669 | A1 | 8/2012 | Lai et al. |
| 2012/0307900 | A1 | 12/2012 | Demos |
| 2013/0003845 | A1 | 1/2013 | Zhou et al. |
| 2013/0034165 | A1* | 2/2013 | Sasai .................. H04N 19/176 375/240.16 |
| 2013/0070858 | A1 | 3/2013 | Demos |
| 2013/0077697 | A1 | 3/2013 | Chen et al. |
| 2013/0182780 | A1 | 7/2013 | Alshin et al. |
| 2013/0215974 | A1 | 8/2013 | Chong et al. |
| 2014/0044161 | A1 | 2/2014 | Chen et al. |
| 2014/0072048 | A1 | 3/2014 | Ma et al. |
| 2014/0133546 | A1 | 5/2014 | Bandoh et al. |
| 2014/0192862 | A1 | 7/2014 | Flynn et al. |
| 2014/0192865 | A1 | 7/2014 | Zhang et al. |
| 2014/0254680 | A1 | 9/2014 | Ho et al. |
| 2015/0078448 | A1 | 3/2015 | Puri et al. |
| 2015/0116539 | A1 | 4/2015 | Nayar et al. |
| 2015/0124864 | A1 | 5/2015 | Kim et al. |
| 2015/0237358 | A1 | 8/2015 | Alshin et al. |
| 2016/0014411 | A1* | 1/2016 | Sychev .................. H04N 19/56 375/240.12 |
| 2016/0105685 | A1 | 4/2016 | Zou et al. |
| 2018/0048910 | A1 | 2/2018 | Kalevo et al. |
| 2019/0215515 | A1 | 7/2019 | Sychev |

FOREIGN PATENT DOCUMENTS

| | | | | |
|---|---|---|---|---|
| CN | 103650509 | A | 3/2014 | |
| CN | WO2014158050 | A1 * | 10/2014 | ........... H04N 19/117 |
| CN | 104937941 | A | 9/2015 | |
| EP | 1841230 | A1 | 10/2007 | |
| EP | 2111719 | B1 | 8/2014 | |
| EP | 2819413 | A1 | 12/2014 | |
| EP | 2860980 | A1 | 4/2015 | |
| JP | 2001057677 | A | 2/2001 | |
| JP | 2003333604 | A | 11/2003 | |
| JP | 2004007337 | A | 1/2004 | |
| JP | 2006067213 | A | 3/2006 | |
| JP | 2006513592 | A | 4/2006 | |
| JP | 2008054267 | A | 3/2008 | |
| JP | 2010507286 | A | 3/2010 | |
| JP | 2010110004 | A | 5/2010 | |
| JP | 2011527553 | A | 10/2011 | |
| JP | 2013542666 | A | 11/2013 | |
| JP | 2014504098 | A | 2/2014 | |
| JP | 2015165726 | A | 9/2015 | |
| RU | 2358410 | C2 | 6/2009 | |
| RU | 2008106939 | A | 8/2009 | |
| RU | 2521081 | C2 | 6/2014 | |
| WO | 2012109528 | A1 | 8/2012 | |
| WO | 2013058876 | A1 | 4/2013 | |
| WO | 2013147495 | A1 | 10/2013 | |
| WO | 2014158050 | A1 | 10/2014 | |

OTHER PUBLICATIONS

Lu et al., "CE6.H related: Results on Modified Binarization for Region Boundary Chain Coding," Joint Collaborative Team on 3D Video Coding Extensions of ITU-T SG 16 WP 3 and ISO/IEC JTC 1/SC 29/WG 11, 4th Meeting: Incheon, KR, JCT3V-D0077, International Telecommunication Union, Geneva Switzerland, (Apr. 20-26, 2013).

Yoon et al.,"Adaptive filtering for prediction signal in video compression", 2011 IEEE International Conference Onconsumer Electronics—Berlin(ICCE—Berlin), XP031968553, Institute of Electrical and Electronics Engineers, New York, New York (2011).

Sychev et al., "Sharpening filter for interlayer prediction", 2014 IEEE Visual Communications and Image Processing Conference, XP032741195, Institute of Electrical and Electronics Engineers, Valbonne, France (2014).

Sychev et al., "Inter-layer prediction modes based on base layer sharpness filter," Joint Collaborative Team on Video eroding (JCT-VC) of ITU-T SG16 WP3 and ISO/IEC JTC 1/SC 29/WG11, 14th Meeting, Vienna, AT, XP030114511, JCTVC-N0070, International Telecommunications Union, Geneva Switzerland, (Jul. 25-Aug. 2, 2013).

"Series H: Audiovisual and Multimedia Systems Infrastructure of audiovisual services—Coding of moving video High efficiency video coding," ITU-T H.265, International Telecommunications Union, Geneva Switzerland, (Apr. 2015).

Ma et al., "SCE4: Switchable De-ringing Filter for Inter-layer Prediction," Joint Collaborative Team on Video Coding (JCT-VC) of ITU-T SG 16 WP 3 and ISO/IEC JTC 1/SC 29/WG 11 13th Meeting: Incheon, KR, JCTVC-M0055, (Apr. 18-26, 2013).

Laude et al., "Motion Blur Compensation in Scalable HEVC Hybrid Video Coding," 2013 IEEE, Institute of Electrical and Electronics Engineers, New York, New York (2013).

Ma et al., "De-Ringing Filter for Scalable Video Coding," 2013 IEEE International Conference on Multimedia and Expo Workshops (ICMEW), Institute of Electrical and Electronics Engineers, New York, New York (Jul. 2013).

Helle et al., "A Scalable Video Coding Extension of HEVC," 2013 Data Compression Conference, Institute of Electrical and Electronics Engineers, New York, New York (Mar. 2013).

Alshina et al., "Inter-layer Filtering for Scalable Extension of HEVC," 2013 IEEE, PCS 2013, Institute of Electrical and Electronics Engineers, New York New York (2013).

"Series H: Audiovisual and Multimedia Systems Infrastructure of audiovisual services—Coding of moving video Advanced video coding for generic audiovisual services," ITU-T H.264, pp. 1-790, Telecommunication Standardization Sector of ITU, International Telecommunications Union, Geneva, Switzerland (Feb. 2014).

"Line Transmission of Non-Telephone Signals Video Codec for Audiovisual Services at px64 kbits," ITU-T H.261, Telecommunication Standardization Sector of ITU, pp. 1-29, International Telecommunications Union, Geneva, Switzerland (Mar. 1993).

(56) References Cited

OTHER PUBLICATIONS

"Series H: Audiovisual and Multimedia Systems Infrastructure of audiovisual services—Coding of moving video Video coding for low bit rate communication," ITU-T H.263, Telecommunication Standardization Sector of ITU, pp. 1-226, International Telecommunications Union, Geneva, Switzerland (Jan. 2005).
Arad et al., "Enhancement by Image-Dependent Warping," IEEE Transactions on Image Processing, vol. 8, No. 8, pp. 1063-1074, Institute of Electrical and Electronic Engineers, New York, New York (Aug. 1999).
Prades-Nebot et al., "Image enhancement using warping technique," Electronics Letters, vol. 39, No. 1, pp. 32-33, Institute of Electrical and Electronics Engineers, New York, New York (Jan. 9, 2003).
Yoon et al., "Adaptive Prediction Block Filter for Video Coding," ETRI Journal, vol. 34, No. 1, Electronics and Telecommunications Research Institute, Daejeon, South Korea (Feb. 2012).
Maxim et al., "SCE3: Inter-layer prediction modes based on base layer sharpness filter," Joint Collaborative Team on Video Coding (JCT-VC) of ITU-T SG 16 WP 3 and ISO/IEC JTC 1/SC 291WG 11, JCTVC-O0163, pp. 1-7, International Telecommunications Union, Geneva, Switzerland (Oct. 23-Nov. 1, 2013).
Wedi, "Adaptive Interpolation Filter for Motion Compensated Prediction," IEEE ICIP 2002, pp. 509-512, Institute of Electrical and Electronics Engineers, New York, New York, (2002).
Vatis et al., "Motion- and Aliasing-Compensated Prediction Using a Two-Dimensional Non-Separable Adaptive Wiener Interpolation Filter," pp. 1-4, Institute of Electrical and Electronics Engineers, New York, New York, (2005).
Rusanovskyy et al.,"Video Coding With Low-Complexity Directional Adaptive Interpolation Filters," IEEE Transactions on Circuits and Systems for Video Technology, vol. 19, No. 8, pp. 1239-1243, Institute of Electrical and Electronics Engineers, New York, New York (Aug. 2009).
Dong et al., "Parametric Interpolation Filter for HD Video Coding," IEEE Transactions on Circuits and Systems for Video Technology, vol. 20, No. 12, pp. 1892-1897, Institute of Electrical and Electronics Engineers, New York,New York, (Dec. 2010).
Matsuo et al.,"Enhanced Region-Based Adaptive Interpolation Filter," 28th Picture Coding Symposium, PCS2010, Nagoya, Japan, pp. 526-529, Institute of Electrical and Electronics Engineers, New York, New York (Dec. 8-10, 2010).
Murakami et al., "High efficiency video coding technology HEVC /11.265 and its application," Abstract, Ohm Company, Nakagawa, Japan (2013).
Sajjad et al., "Digital image super-resolution using adaptive interpolation based on Gaussian function," Multimedia Tools and Applications, vol. 74, No. 20, XP035547508, pp. 8961-8977, Kluwer Academics Publishers, Boston, USA (Jul. 9, 2013).
Turkowski, "Filters for Common Resampling Tasks," XP002592040, pp. 1-14 (Apr. 10, 1990).
Masaru et al., "TE12.2: Results on MC interpolation filters," Joint Collaborative Team on Video Coding (JCT-VC) of ITU-T SG16 WP3 and ISO/IEC JTC1/SC29/WG11, 3rd Meeting, Guangzhou, China, JCTVC-C162, pp. 1-26, International Telecommunication Union, Geneva, Switzerland (Oct. 7-14, 2010).
Ugur et al., "Motion Compensated Prediction and Interpolation Filter Design in H.265/HEVC," IEEE Journal of Selected Topics in Signal Processing, vol. 7, No. 6, pp. 946-956, Institute of Electrical and Electronics Engineers, New York, New York (Dec. 2013).
Liu et al., "Motion Blur Compensation in HEVC Using Fixed-Length Adaptive Filter," IEEE Picture Coding Symposium (PCS), pp. 30-34, Institute of Electrical and Electronics Engineers, New York, New York (2015).
Liu, "Unified Loop Filter for Video Compression," IEEE Transactions on Circuits and Systems for Video Technology, vol. 20, No. 10, pp. 1378-1382, Institute of Electrical and Electronics Engineers, New York, New York (Oct. 2010).
Tsai et al., "Adaptive Loop Filtering for Video Coding," IEEE Journal of Selected Topics in Signal Processing, vol. 7, No. 6, pp. 934-945, Institute of Electrical and Electronics Engineers, New York, New York (Dec. 2013).
Chiu et al., "Adaptive (Wiener) Filter for Video Compression," ITU-T Study Group 16-Conlribulion 437, Document VCEG-AI14, COM 16-C 437 R1-E, pp. 1-7, International Telecommunication Union, Geneva, Switzerland (Apr. 2008).
Zhang, "Video Image Enhancement Technology Based on Real-time Processing of FPGA," With English Abstract, North University of China, pp. 1-71, North University of China, Tayuan, China (May 2011).

* cited by examiner

ADAPTIVE SHARPENING FILTER FOR PREDICTIVE CODING

CROSS-REFERENCE TO RELATED APPLICATIONS

This application is a continuation of International Application No. PCT/RU2015/000612, filed on Sep. 25, 2015, the disclosure of which is hereby incorporated by reference in its entirety.

TECHNICAL FIELD

Embodiments of the present disclosure generally relate to the field of video processing, and specifically relates to a video coder and a video decoder for supporting predictive coding. The present disclosure relates further to a method for predictive coding a video and to a method for decoding an encoded video bit stream obtained by predictive coding. Finally, the present disclosure relates to a computer program having a program code for performing such a method.

BACKGROUND

Known video systems use prediction coding for increasing the coding and decoding efficiency. Examples of prediction coding include inter layer prediction of scalable video coding and inter frame prediction.

The scalable video codec is the answer of the telecommunication industry to the rising demand for video streaming to mobile devices including smartphones, tablets or notebooks as well as other equipment having a broad variety of screen sizes and computing capabilities. Moreover modern video transmission systems using the Internet and mobile networks are typically characterized by a wide range of connection qualities, which depends on adaptive resource sharing mechanisms. In such heterogeneous environments with varying connection qualities and different receiving devices, a flexible adaptation of once-encoded content is desirable.

In this respect, the scalable video codec generates a layered bit-stream. A layered structure of any scalable video content can be defined as the combination of a base layer and at least one additional enhancement layer. The base layer corresponds to the lowest supported video performance, whereas the enhancement layers allow for the refinement of the mentioned base layer. The improvement achievable by the enhancement layers can relate to quality, frame rate or spatial refinement with higher spatial resolution.

FIG. 1 shows a video coder 100 for inter layer prediction coding of a series of video frames 101 according to the state of the art known, for example, from the H.265/SHVC scalable video coding. The coder 100 comprises a spatial enhancement layer 102 for receiving the video frame 101 and generating an encoded enhancement layer bitstream. The coder 100 further comprises a downsampling filter 107 for generating a downsampled video frame 111 from the video frame 101, and a spatial base layer 112 for receiving the downsampled video frame 111 and for generating an encoded base layer bitstream. The coder 100 further comprises a multiplex unit 118 for multiplexing the encoded enhancement layer bitstream and the encoded base layer bitstream and generating an encoded video bit stream.

The spatial base layer 112 comprises successive units that are a temporal scalable coding unit 113 receiving the downsampled video frame 111, a prediction unit 114, a base layer coding unit 115, a SNR scalable coding unit 116, and an upsampling filter 117. The respective outputs of the base layer coding unit 115 and of the SNR scalable coding unit 116 are provided to the multiplex unit 118. The spatial enhancement layer 102 comprises successive units that are a temporal scalable coding unit 103 receiving the video frame 101, a prediction unit 104, a base layer coding unit 105, and a SNR scalable coding unit 106. The respective outputs of the base layer coding unit 105 and of the SNR scalable coding unit 106 are provided to the multiplex unit 118.

The output of the upsampling filter 117 of the spatial base layer 112 corresponds to a prediction block for an inter-layer prediction and is fed to the prediction unit 104 of the spatial enhancement layer. The information from the base layer is used to increase the compression ratio of the enhancement layers. This has the effect that the bit-rate of video signals can be reduced.

However, such a known inter layer prediction for spatial enhancement layer uses upsampling of the base layer frame. The upsampled base layer frame thereby suffers from blurred edges and from a low amount of high frequency details, since such details are not present in the base layer reference frame. Moreover, the quality of the upsampled frame also depends on the properties of the upsampling filter 117. Short-tap filters may suppress high frequencies and render an interpolated frame additionally blurred. In opposite thereto, long-tap filters may preserve high frequencies but generate some ringing artifacts near to the sharp edges.

SUMMARY

Having recognized the above-mentioned disadvantages and problems, the present disclosure aims to improve the state of the art. For example, an object of the present disclosure is to provide a video coder, a coding method, a video decoder, and a decoding method for an improved coding and decoding of a video stream.

The present disclosure, for example allows to improve the efficiency of the predictive coding. For example, the disclosure also allows to better fit to local image features. It is a further object of the disclosure to improve predictive coding by increasing sharpness of edges and reducing ringing artifacts in prediction blocks adaptively to local image content.

Implementations of the present disclosure are defined in the independent claims. Additional implementations of the present disclosure are further defined in the respective dependent claims.

A first aspect of the present disclosure provides a video coder for predictive coding, into an encoded video bit stream, of an original block of an original frame based on a prediction block obtained from a reference frame. The video coder comprises a buffer configured to store the original block. The video coder comprises a buffer configured to store the prediction block. The video coder comprises an adaptive sharpening filter configured to apply a spatial adaptive sharpening filtering to the prediction block.

Thereby, applying a spatial adaptive sharpening filter increases the prediction efficiency, and e.g. the inter layer or inter frame prediction efficiency. As long as the presence of artifacts depends on the existence of edges and on their strength, it is advantageous to provide a filter that is adaptive to local image content, i.e. adaptive to the existence and strength of edges in the blocks. This solution also allows for an adaptation to local features for small regions of coding frame. In the inter layer prediction, the ringing artifacts caused by upsampling filters can be reduced while keeping quality of edges. The edges blurring caused by prediction from a lower resolution frame can be reduced. Also the signalling overhead can be reduced by using an adaptive sharpening filter with only one adaptive coefficient. The signalling overhead can be reduced by exploiting information about edge strength calculated from already transmitted base layer picture. The subjective quality of edges can be increased in reconstructed frames.

In an implementation form of the video coder according to the first aspect, for the predictive coding, into the encoded video bit stream, of a plurality of original blocks of the original frame based respectively on a plurality of prediction blocks obtained from the reference frame, the adaptive sharpening filter is configured to have the possibility to apply a different sharpening filtering to each of the plurality of prediction blocks. Thereby, the filter can be adaptive to local image content, i.e. adaptive to the existence and strength of edges in the blocks.

In an implementation form of the video coder according to the first aspect, the video coder is suitable for inter layer predictive coding of scalable video content comprising a base layer and at least one enhancement layer. The original frame is a frame of an enhancement layer. The reference frame is a frame of a reconstructed base layer. The video coder comprises an upsampling filter configured to upsample the reference frame, the prediction block being a block of the upsampled reference frame. Thereby, the inter layer prediction efficiency can be improved.

In an implementation form of the video coder according to the first aspect, the video coder is suitable for inter frame predictive coding of video content comprising subsequent frames. The original frame is one of the subsequent frames. The reference frame is one of reconstructed subsequent frames. The video coder comprises a buffer configured to store a reference block of the reference frame. The video coder comprises a motion estimation unit configured to obtain a motion vector reflecting motion between the reference block and the original block. The video coder comprises a motion compensation unit configured to generate the prediction block from the reference block based on the motion vector. Thereby, the inter frame prediction efficiency can be improved.

In an implementation form of the video coder according to the first aspect, the video coder comprises a control unit configured to control at least one of a selective bypass of the adaptive sharpening filter and a selective application of the adaptive sharpening filter. The video coder comprises an encoding unit configured to add to the encoded video bit stream sharpening filter information reflecting the at least one of the selective bypass and the selective application of the adaptive sharpening filter. Thereby, a decision can be taken by the control unit to apply or bypass the sharpening filter. The decision can then be adapted to each particular case, for example to the particular video stream to be encoded. Also, the adaptive sharpening filter can be bypassed to save computational resources in the video coder. On the other hand, the adaptive sharpening filter can be applied if the priority shall be given e.g. to the reduction of artifacts.

In an implementation form of the video coder according to the first aspect, the encoding unit is configured to encode the sharpening filter information using a context-adaptive binary arithmetic coding, CABAC. The video coder comprises an edge strength estimation unit configured to estimate an edge strength in the prediction block or a reference block of the reference frame. The video coder comprises a CABAC context switch configured to select a context of the CABAC depending on the estimated edge strength.

In an implementation form of the video coder according to the first aspect, the control unit is configured to control the at least one of the selective bypass and the selective application based on a minimization of a residual block, said residual block being the difference between the original block and the prediction block, or based on a cost criterion that is, for example, a rate distortion optimization. Thereby, the possibility of bypassing or applying the sharpening filter can be further used to improve the predictive coding. By choosing the alternative that minimized the residual block and by correspondingly applying or bypassing the sharpening filter, the quantity of data and, for example, the quantity of transform coefficients to be encoded can be reduced.

In an implementation form of the video coder according to the first aspect, the adaptive sharpening filter is configured to be controlled by at least one adaptive parameter. The video coder comprises a control unit configured to determine a parameter value of the adaptive parameter and supply the determined parameter value to the adaptive sharpening filter. The video coder comprises an encoding unit configured to add to the encoded video bit stream adaptive parameter information about the determined parameter value of the adaptive parameter. Thereby, the adaptive sharpening filter can be optimized and the same filtering can be applied by the coder and the decoder.

In an implementation form of the video coder according to the first aspect, the control unit is configured to supply different parameter values for the adaptive parameter and to select one of the different parameter values based on a minimization of a residual block, said residual block being the difference between the original block and the prediction block, or based on a cost criterion such as, for example, a rate distortion optimization. Thereby, the adaptive sharpening filter can be further optimized.

In an implementation form of the video coder according to the first aspect, the adaptive sharpening filter is a non-linear filter configured to be controlled by a single adaptive parameter. Thereby, the signalling overhead can be reduced.

In an implementation form of the video coder according to the first aspect, the adaptive sharpening filter comprises an edge map calculation unit adapted to generate an edge map of a source block, said source block being the prediction block or a reference block of the reference frame. The adaptive sharpening filter comprises a blurring filter adapted to blur the edge map of the source block. The adaptive sharpening filter comprises a high-pass filter adapted to generate, by high-pass filtering the blurred edge map, a derivative vector for each position of the source block. The adaptive sharpening filter comprises a scaling unit adapted to generate a displacement vector by scaling the derivative vector with a sharpening strength coefficient. The adaptive sharpening filter comprises a warping unit adapted to warp the prediction block based on the displacement vector. The adaptive parameter includes the sharpening strength coefficient. Thereby, this structure of the adaptive sharpening filter defines a non-linear sharpening filter that advantageously can provide better results in terms of elimination of ringing artifacts. Also, the use of the sharpening strength coefficient as adaptive parameter implies that only one adaptive parameter is required, which further reduces the signalling overhead.

In an implementation form of the video coder according to the first aspect, the adaptive parameter information and/or the sharpening filter information is added at a block level for each prediction block, for an arbitrary or regular region of the frame, at a frame level, at a GOP (group of pictures) level, at a PPS (picture parameter set) level or at an SPS (sequence parameter set) level. Thereby, it is possible to set the sharpening filter information and/or adaptive parameter information to a desired granularity so that the signalling can be optimized.

A second aspect of the present disclosure provides a method for predictive coding, into an encoded video bit stream, of an original block of an original frame based on a prediction block obtained from a reference frame. The method comprises storing the original block. The method comprises storing the prediction block. The method comprises an adaptive sharpening filter step comprising applying a spatial adaptive sharpening filtering to the prediction block.

Further features or implementations of the method according to the second aspect of the disclosure can perform the functionality of the video coder according to the first aspect of the disclosure and its different implementation forms.

A third aspect of the present disclosure provides a video decoder for decoding an encoded video bit stream obtained by predictive coding of an original block of an original frame based on a prediction block obtained from a reconstructed reference frame. The video decoder comprises a decoding unit configured to reconstruct the reference frame from the encoded video bit stream. The video decoder comprises a buffer configured to store the prediction block obtained from the reconstructed reference frame. The video decoder comprises an adaptive sharpening filter configured to apply a spatial adaptive sharpening filtering to the prediction block.

Thereby, the advantages obtained with respect to the video coder according to the first aspect are also given with respect to the video decoder according to the third aspect.

In an implementation form of the video decoder according to the third aspect, the video decoder is suitable for decoding the encoded video bit stream obtained by inter layer predictive coding of scalable video content comprising a base layer and at least one enhancement layer. The original frame is a frame of an enhancement layer. The reference frame is a frame of a reconstructed base layer. The video decoder comprises an upsampling filter configured to upsample the reconstructed reference frame, the prediction block being a block of the upsampled reference frame.

In an implementation form of the video decoder according to the third aspect, the video decoder is suitable for decoding the encoded video bit stream obtained by inter frame predictive coding of video content comprising subsequent frames. The original frame is one of the subsequent frames. The reference frame is one of reconstructed subsequent frames. The video decoder comprises a buffer configured to store a reference block of the extracted reference frame. The video decoder comprises a decoding unit configured to extract, from the encoded video bit stream, a motion vector reflecting motion between the reference block and the original block. The video decoder comprises a motion compensation unit configured to generate the prediction block from the reference block based on the motion vector.

In an implementation form of the video decoder according to the third aspect, the video decoder comprises a decoding unit configured to extract, from the encoded video bit stream, sharpening filter information reflecting at least one of a selective bypass of the adaptive sharpening filter and a selective application of the adaptive sharpening filter to the prediction block. The video decoder comprises a control unit configured to control the at least one of the selective bypass and the selective application depending on the extracted sharpening filter information. Thereby, it can be ensured that both the video coder and the video decoder carry out the same prediction.

In an implementation form of the video decoder according to the third aspect, the decoding unit is configured to decode the sharpening filter information according to a context-adaptive binary arithmetic coding, CABAC. The video decoder comprises an edge strength estimation unit configured to estimate an edge strength in the prediction block or a reference block of the reference frame. The video decoder comprises a CABAC context switch configured to select a context of the CABAC depending on the estimated edge strength.

In an implementation form of the video decoder according to the third aspect, the adaptive sharpening filter is configured to be controlled by at least one adaptive parameter. The video decoder comprises a decoding unit configured to extract, from the encoded video bit stream, adaptive parameter information about a parameter value of the adaptive parameter. The video decoder comprises a control unit configured to control the adaptive sharpening filter according to the extracted adaptive parameter information. Thereby, it can be ensured that both the video coder and the video decoder carry out the same adaptation of the sharpening filter and that the video obtained by the video decoder corresponds to the video encoded by the video coder.

In an implementation form of the video decoder according to the third aspect, the adaptive sharpening filter is a non-linear filter configured to be controlled by a single adaptive parameter. Thereby, the signalling overhead can be further reduced.

In an implementation form of the video decoder according to the third aspect, the adaptive sharpening filter comprises an edge map calculation unit adapted to generate an edge map of a source block, said source block being the prediction block or a reference block of the reference frame. The adaptive sharpening filter comprises a blurring filter adapted to blur the edge map of the source block. The adaptive sharpening filter comprises a high-pass filter adapted to generate, by high-pass filtering the blurred edge map, a derivative vector for each position of the source block. The adaptive sharpening filter comprises a scaling unit adapted to generate a displacement vector by scaling the derivative vector with a sharpening strength coefficient. The adaptive sharpening filter comprises a warping unit adapted to warp the prediction block based on the displacement vector. The adaptive parameter includes the sharpening strength coefficient. Thereby, the artifacts can be reduced while keeping signalling overhead limited.

In an implementation form of the video decoder according to the third aspect, the adaptive parameter information and/or the sharpening filter information is extracted at a block level for each prediction block, for an arbitrary or regular region of the frame, at a frame level, at a GOP (group of pictures) level, at a PPS (picture parameter set) level or at an SPS (sequence parameter set) level. Thereby, it is possible to set the sharpening filter information and/or adaptive parameter information to a desired granularity so that the signalling can be optimized.

A fourth aspect of the present disclosure provides a method for decoding an encoded video bit stream obtained by predictive coding of an original block of an original frame based on a prediction block obtained from a reconstructed reference frame. The method comprises a decoding step comprising reconstructing the reference frame from the encoded video bit stream. The method comprises storing the prediction block obtained from the reconstructed reference frame. The method comprises an adaptive sharpening filter step comprising applying a spatial adaptive sharpening filtering to the prediction block.

Further features or implementations of the method according to the fourth aspect of the disclosure can perform the functionality of the video decoder according to the third aspect of the disclosure and its different implementation forms.

A fifth aspect of the present disclosure provides a computer program having a program code for performing such a coding and/or decoding method when the computer program runs on a computing device.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings, in which.

DETAILED DESCRIPTION OF EMBODIMENTS

According to a general embodiment of the present disclosure, a video coder for predictive coding, into an encoded video bit stream, of an original block of an original frame based on a prediction block obtained from a reference frame is proposed. The video coder comprising a buffer configured to store the original block, a buffer configured to store the prediction block, and an adaptive sharpening filter configured to apply a spatial adaptive sharpening filtering to the prediction block.

Particularly, for the predictive coding, into the encoded video bit stream, of a plurality of original blocks of the original frame based respectively on a plurality of prediction blocks obtained from the reference frame, the adaptive sharpening filter is configured to have the possibility to apply a different sharpening filtering to each of the plurality of prediction blocks.

According to a general embodiment of the present disclosure, a video decoder for decoding an encoded video bit stream obtained by predictive coding of an original block of an original frame based on a prediction block obtained from a reconstructed reference frame is proposed. The video decoder comprises a decoding unit configured to reconstruct the reference frame from the encoded video bit stream, a buffer configured to store the prediction block obtained from the reconstructed reference frame, and an adaptive sharpening filter configured to apply a spatial adaptive sharpening filtering to the prediction block.

Similarly, for the predictive decoding of a plurality of original blocks of the original frame based respectively on a plurality of prediction blocks obtained from the reconstructed reference frame, the adaptive sharpening filter is configured to have the possibility to apply a different sharpening filtering to each of the plurality of prediction blocks.

Figure 1:
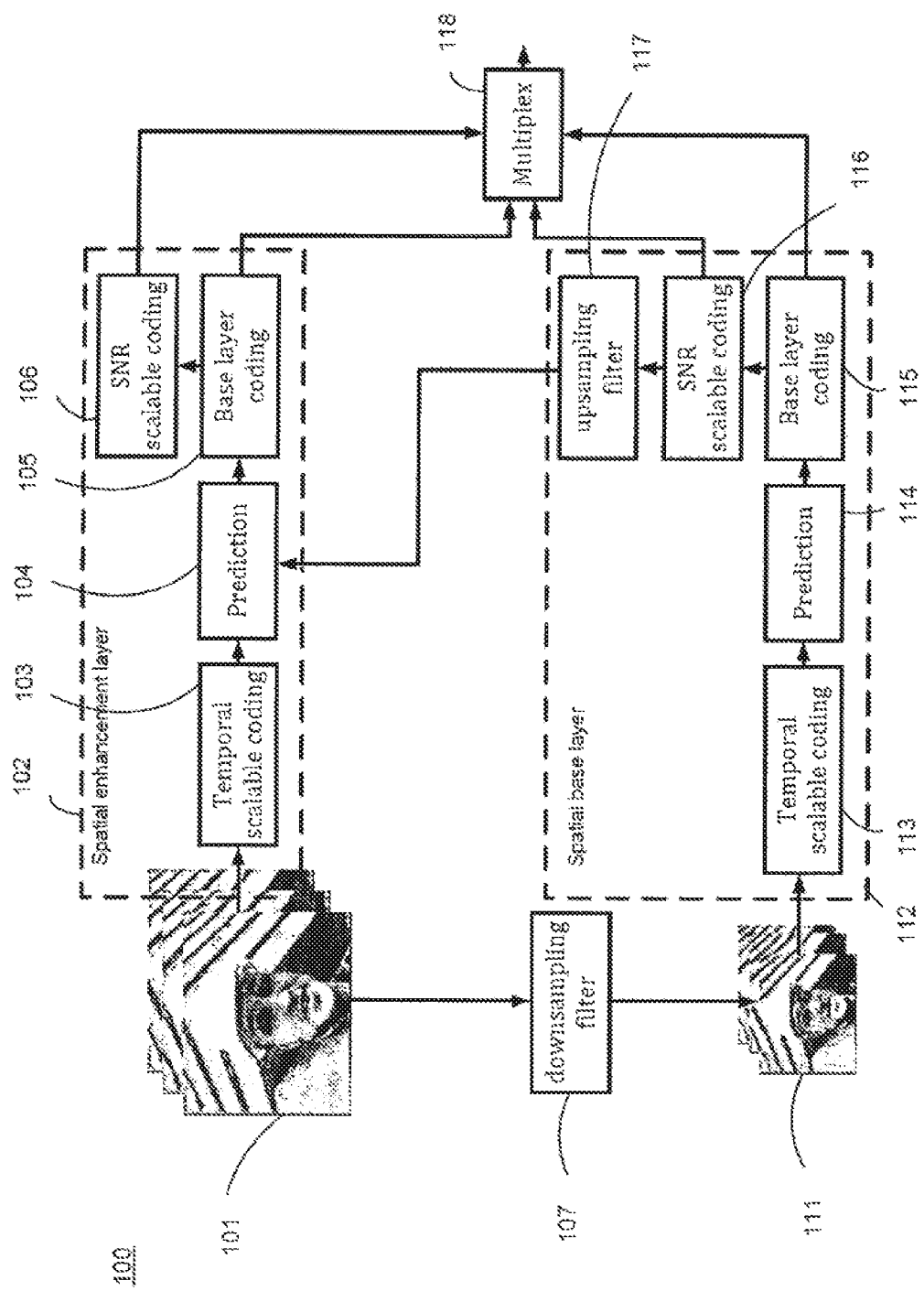
FIG. 1 shows an overview of a video coder for inter layer predictive coding according to the state of the art.
Figure 2:
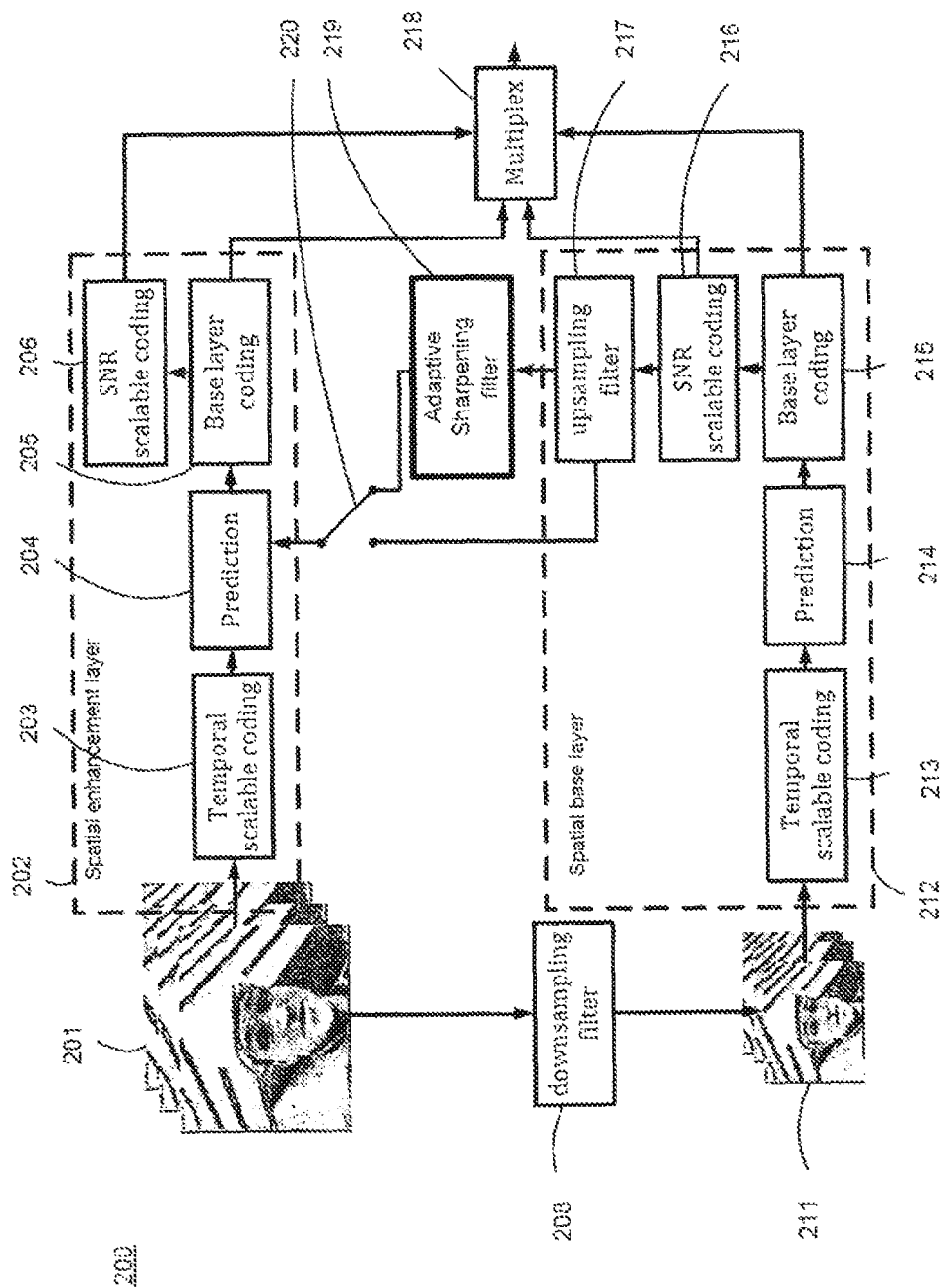
FIG. 2 shows an overview of a video coder for inter layer predictive coding according to an embodiment of the present disclosure.

FIG. 2 shows an overview of a video coder 200 according to an embodiment of the present disclosure. Particularly, FIG. 2 shows a video coder 200 for inter layer predictive coding of scalable video content comprising a base layer and at least one enhancement layer.

The video coder 200 comprises a spatial enhancement layer 202 for receiving a video frame 201 and generating an encoded enhancement layer bitstream. The coder 200 further comprises a downsampling filter 208 for generating a downsampled video frame 211 from the video frame 201, and a spatial base layer 212 for receiving the downsampled video frame 211 and for generating an encoded base layer bitstream. The coder 200 further comprises a multiplex unit 218 for multiplexing the encoded enhancement layer bitstream and the encoded base layer bitstream and generating an encoded video bit stream.

The spatial base layer 212 comprises a temporal scalable coding unit 213 receiving the downsampled video frame 211, wherein the downsampled video frame 211 presents a lower resolution than the video frame 201. The output of the temporal scalable coding unit 213 is fed to a prediction unit 214 that provides a prediction signal based on the temporal scaled coded version of the downsampled video frame 211 to a base layer coding unit 215. An output of the base layer coding unit 215 is provided to a SNR scalable coding unit 216. Respective outputs of the base layer coding unit 215 and of the SNR scalable coding unit 216 are provided to the multiplex unit 218.

The spatial enhancement layer 202 comprises successive units that are a temporal scalable coding unit 203 receiving the video frame 201, a prediction unit 204, a base layer coding unit 205, and a SNR scalable coding unit 206. Respective outputs of the base layer coding unit 205 and of the SNR scalable coding unit 206 are provided to the multiplex unit 218. The multiplex unit 218 generates the encoded video bit stream by multiplexing the outputs of the base layer coding unit 215, the SNR scalable coding unit 216, the base layer coding unit 205, and the SNR scalable coding unit 206.

According to the present disclosure, the prediction block generated by the upsampling filter 217 is fed to an adaptive sharpening filter 219 configured to apply a spatial adaptive sharpening filtering to the prediction block. The output of the upsampling filter 217 of the spatial base layer 212 is a prediction block for an inter layer prediction coding of the video frame 201 of the spatial enhancement layer 202. The prediction block generated by the upsampling filter 217 as well as the sharpened prediction block generated by the adaptive sharpening filter 219 are preferably both transmitted to a switch 220 that is connected to the prediction unit 204 of the spatial enhancement layer 202. The predictive coding of the video frame 201 of the spatial enhancement layer 202 can be selectively based on the output of the upsampling filter 217 or on the output of the adaptive sharpening filter 219.

Figure 3:
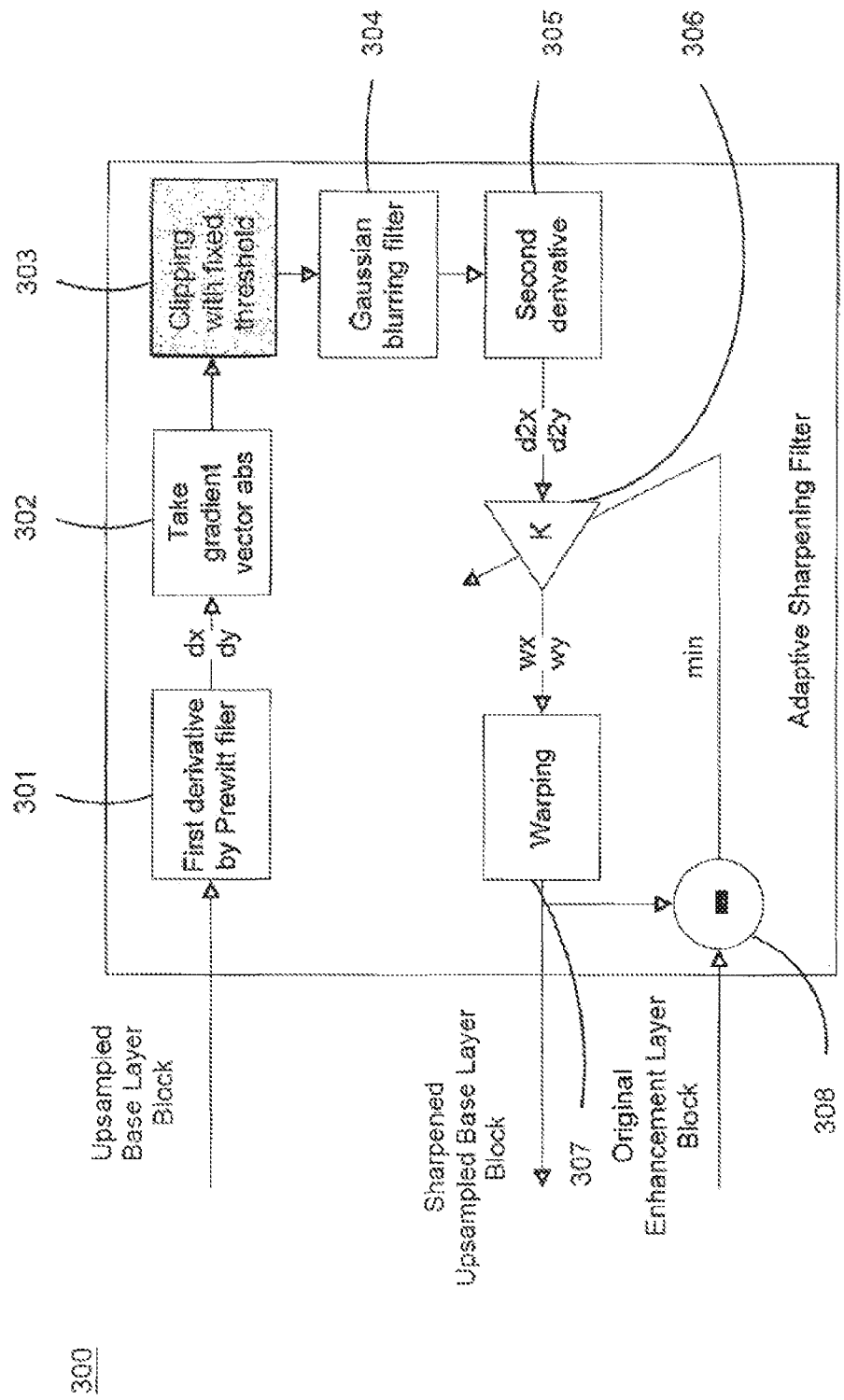
FIG. 3 shows an adaptive sharpening filter according to an embodiment of the present disclosure.
Figure 4:
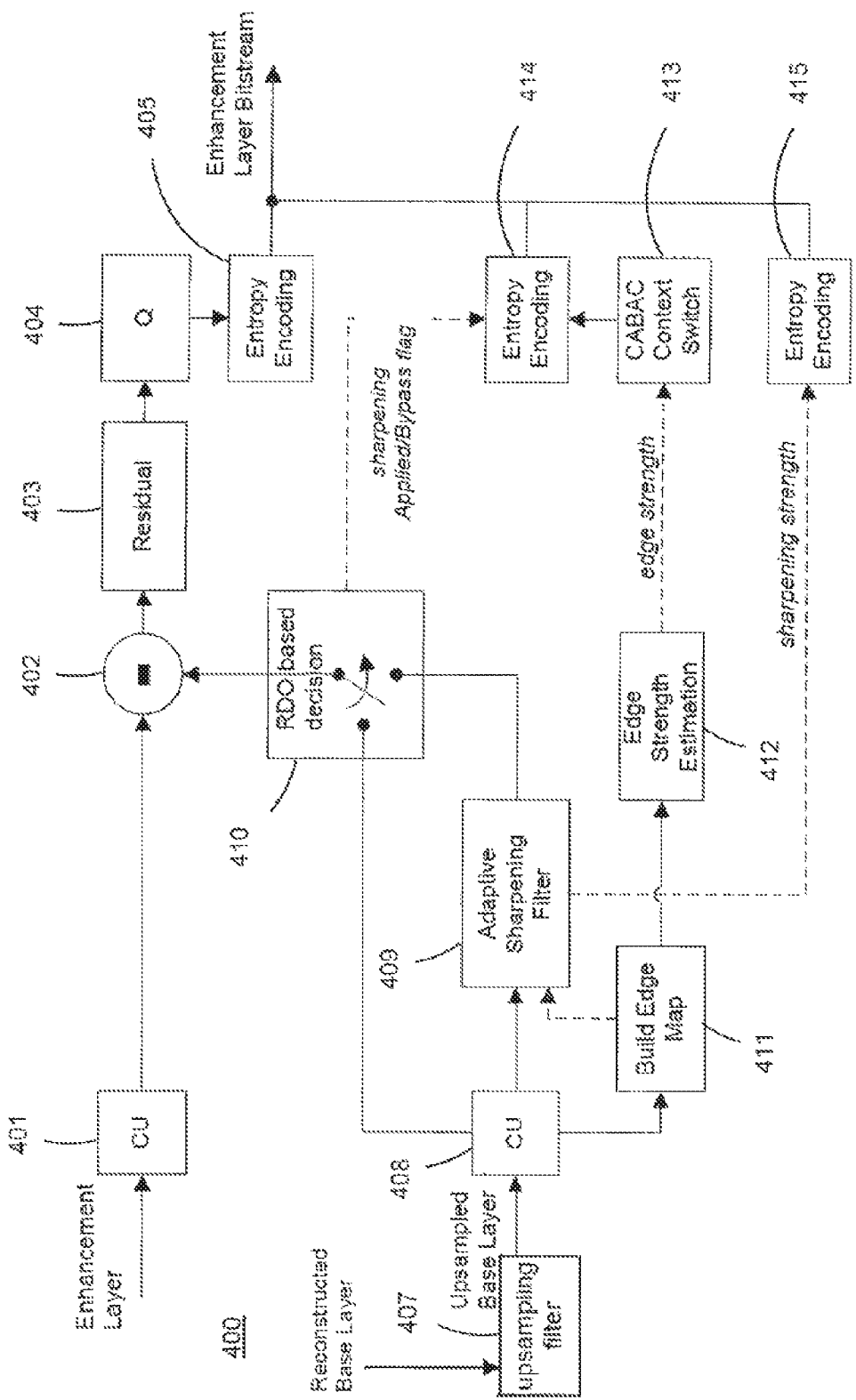
FIG. 4 shows a video coder for inter layer predictive coding according to an embodiment of the present disclosure.
Figure 5:
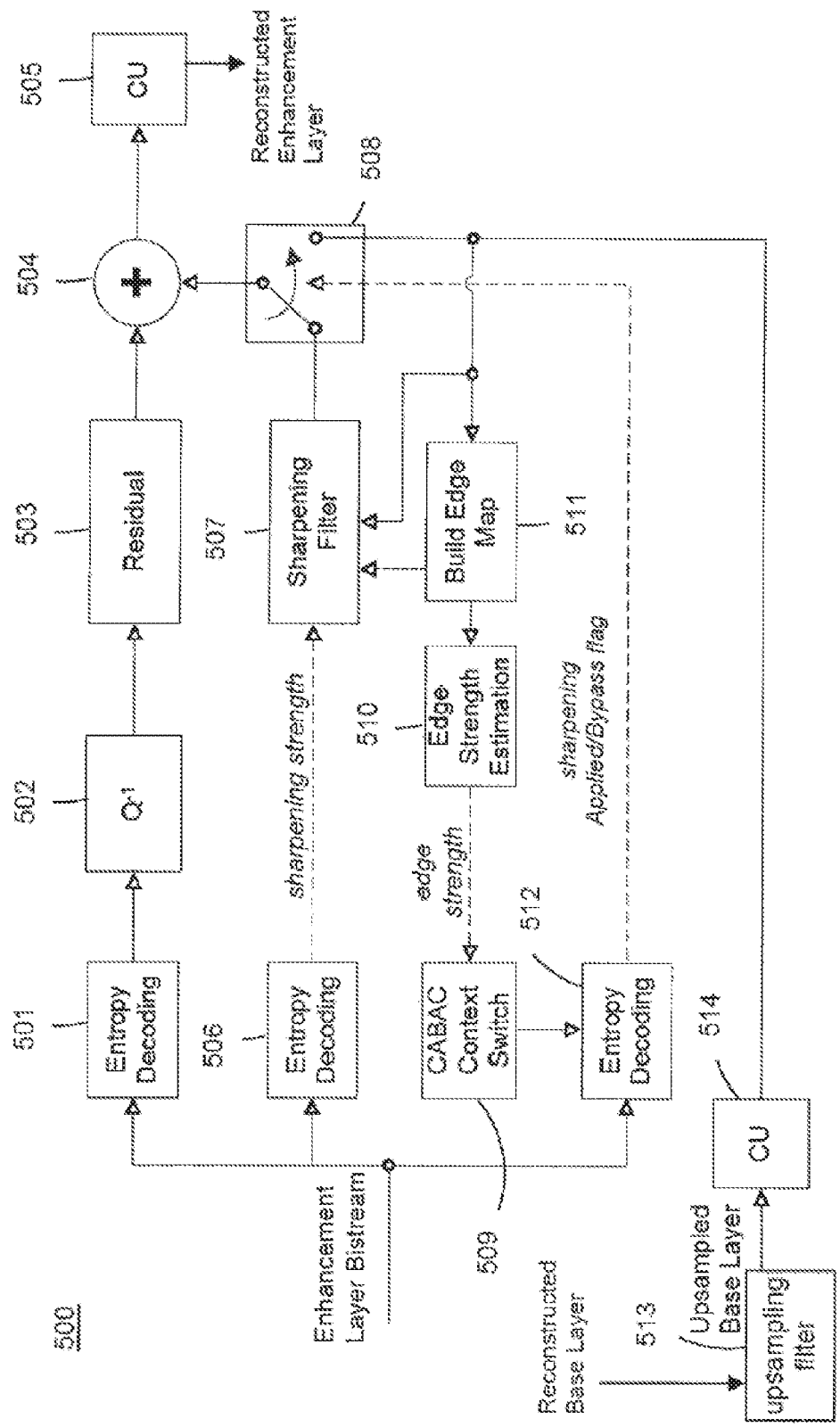
FIG. 5 shows a video decoder for inter layer predictive coding according to an embodiment of the present disclosure.
Figure 6:
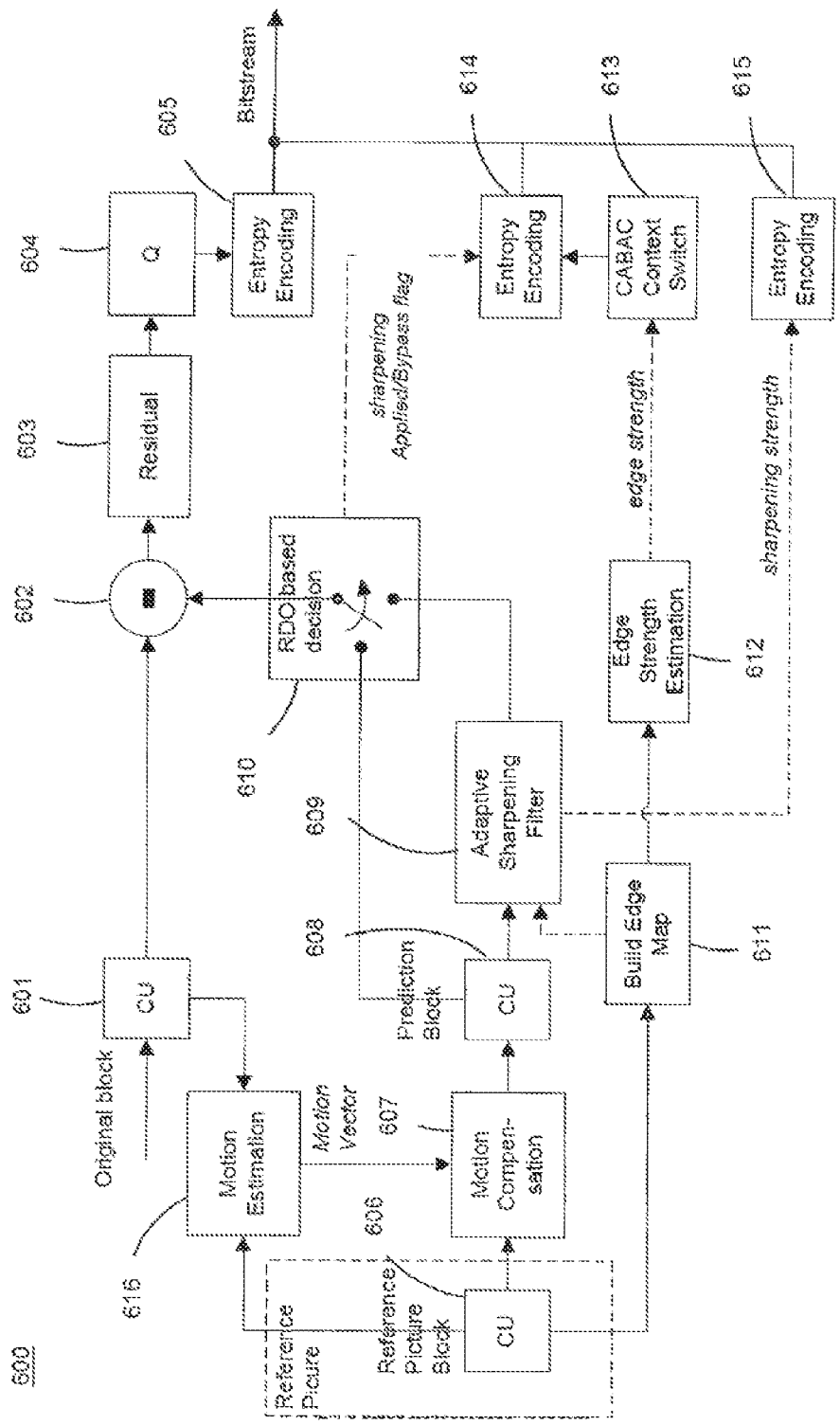
FIG. 6 shows a video coder for inter frame predictive coding according to an embodiment of the present disclosure.
Figure 7:
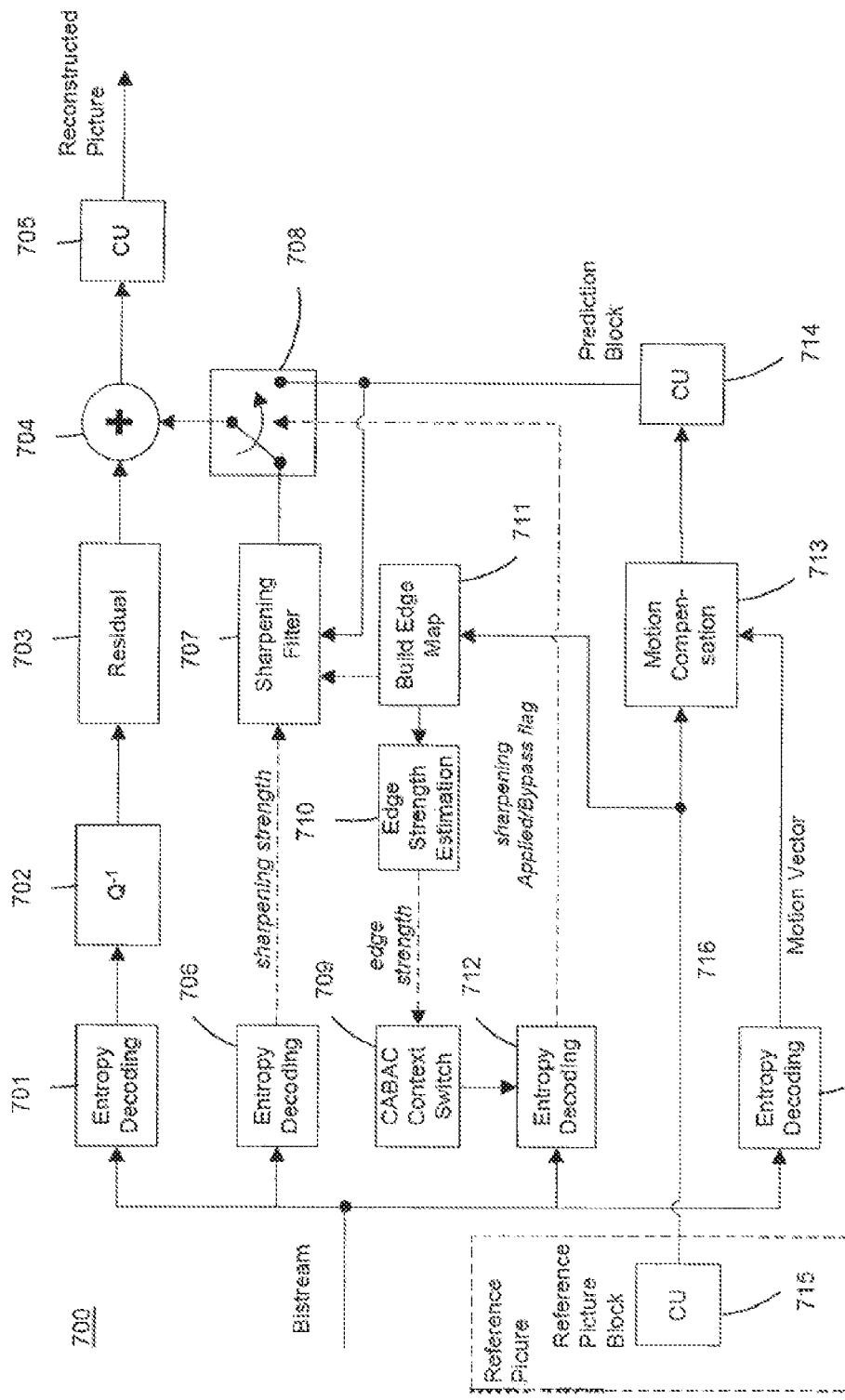
FIG. 7 shows a video decoder for inter frame predictive coding according to an embodiment of the present disclosure.

In the followings, the disclosure will be described with respect to FIGS. 4 and 5 showing respectively a video coder and decoder for inter layer predictive coding according to an embodiment of the present disclosure, and with respect to FIGS. 6 and 7 showing respectively a video coder and decoder for inter frame predictive coding according to an embodiment of the present disclosure. FIG. 3 shows an embodiment of the adaptive sharpening filter of e.g. the video coder for inter layer predictive coding or the video coder for inter frame predictive coding of FIGS. 4 and 6.

FIG. 4 shows a video coder 400 according to an embodiment of the present disclosure, and particularly a video coder 400 for inter layer predictive coding of scalable video content comprising a base layer and at least one enhancement layer.

The video coder 400 is suitable for predictive coding, into an encoded video bit stream, of an original block of an original frame based on a prediction block obtained from a reference frame. The video coder 400 comprises a buffer 401 configured to store the original block, a buffer 408 configured to store the prediction block, and an adaptive sharpening filter 409 configured to apply a spatial adaptive sharpening filtering to the prediction block.

In the context of the inter layer predictive coding, the original frame is a frame of the enhancement layer, and the reference frame is a frame of a reconstructed base layer. The video coder 400 further on comprises an upsampling filter 407 configured to upsample the reconstructed base layer, i.e. to upsample the reference frame. The prediction block stored in the buffer 408 is a block of the upsampled reference frame.

Particularly, the original frame is a frame of the enhancement layer that is currently encoded, and can e.g. be obtained from the video frame 201 of the video coder 200 of FIG. 2. On the other hand, the reference frame is a frame of the base layer that has been encoded and reconstructed. The reconstructed base layer frame can be obtained in video coder 200 of FIG. 2 by the spatial base layer 212 from the downsampled video frame 211. In the followings, any reference to the feature "frame" may be replaced by a reference to the feature "picture".

The original block stored in the buffer 401 and the prediction block stored in the buffer 408, and more generally all blocks of the present disclosure, are preferably a respective area or sub-area of a frame. E.g. the original block is an area or sub-area of the original frame, while the prediction block is an area or sub-area of the upsampled reference frame as generated by the upsampling filter 407. Such a block may have a regular shape, like e.g. a rectangular shape, or an irregular shape. Alternatively, the block can have the same size as the frame. All blocks, and particularly the original block and the prediction block, have the same size. The size of the blocks can be defined by means of block mode information transmitted to a decoder as side information or signalling data of the encoded video bit stream. A block can correspond to a coding unit that is a basic coding structure of the video sequence of a pre-defined size, containing a part of a frame, e.g. 64×64 pixels.

Particularly, the video coder 400 comprises further units for supporting predictive video coding. For example, the video coder 400 comprises a transform and quantization unit 404 for generating transform coefficients via a transformation into the frequency domain and quantizing the coefficients, as well as an entropy encoder or entropy encoding unit 405 for entropy coding the quantized coefficients, for example, together with signalling data. The input of the transform and quantization unit 404 is a residual block that can be stored in a dedicated buffer 403. The residual block is generated by a subtracting unit 402 and is defined as the difference between the original block stored in the buffer 401 and either the prediction block stored in the buffer 408 or a sharpened prediction block generated by the adaptive sharpening filter 409.

The video coder 400 further comprises a control unit 410 and an encoding unit 414. The control unit 410 is configured to control at least one of a selective bypass of the adaptive sharpening filter 409 and a selective application of the adaptive sharpening filter 409. The encoding unit 414 is configured to add to the encoded video bit stream sharpening filter information reflecting the at least one of the selective bypass and the selective application of the adaptive sharpening filter 409. The sharpening filter information is preferably in the form of a sharpening applied/bypass flag.

The adaptive sharpening filter 409 can be selectively bypassed and/or selectively applied by the control unit 410. In case the adaptive sharpening filter 409 is applied, the adaptive sharpening filter 409 generates the sharpened prediction block and the residual block is obtained by the difference of the original block and the sharpened prediction block that is outputted by the adaptive sharpening filter 409. In case the adaptive sharpening filter 409 is bypassed, the residual block is obtained by the difference of the original block and the prediction block that is stored in the buffer 408.

Particularly, the control unit 410 is configured to control the at least one of the selective bypass and the selective application based on a minimization of the residual block, or based on a cost criterion that is, for example, a rate distortion optimization. The cost criterion may be particularly applied to the residual block obtained from the sharpened prediction block that is outputted by the adaptive sharpening filter 409, and to the residual block obtained from the prediction block stored in the buffer 408. Depending on the result of the cost function, the adaptive sharpening filter 409 may be either applied or bypassed.

The decision of the control unit 410 to bypass or apply the adaptive sharpening filter 409 can be transmitted as signalling data within the encoded video bit stream generated by the encoding unit or entropy encoding unit 405. The control unit 410 transmits the sharpening filter information to the encoding unit 414 that adds the sharpening filter information as signalling data in the encoded video bit stream generated by the encoding unit 405.

Alternatively, the adaptive sharpening filter 409 can be always applied. This means that the residual block is always obtained by the difference of the original block and the sharpened prediction block that is outputted by the adaptive sharpening filter 409. It is obvious that in this case no additional signalling about appliance or bypassing of adaptive sharpening filter is required.

The encoding unit 414 is particularly configured to encode the sharpening filter information using a context-adaptive binary arithmetic coding, CABAC. The video coder 400 comprises further an edge strength estimation unit 411, 412 configured to estimate an edge strength in the prediction block, and a CABAC context switch 413 configured to select a context of the CABAC depending on the estimated edge strength. For example, the edge strength estimation unit 411, 412 comprises a first unit 411 for building an edge map of the prediction block and a second unit 412 for estimating an edge strength of the edge map.

Further on, the adaptive sharpening filter 409 is configured to be controlled by at least one adaptive parameter. The control unit 410 is configured to determine a parameter value of the adaptive parameter and supply the determined parameter value to the adaptive sharpening filter 409. The video coder 400 also comprises an encoding unit 415 that is configured to add to the encoded video bit stream adaptive parameter information about the determined parameter value of the adaptive parameter.

Particularly, the control unit 410 is configured to supply different parameter values for the adaptive parameter and to select one of the different parameter values based on a minimization of the residual block, or based on a cost criterion such as, for example, a rate distortion optimization.

The decision about applying or bypassing the adaptive sharpening filter 409 and the decision about the value of the adaptive parameter, in case of sharpening filter applying, is signalled to a decoder of the encoded video bit stream by means of the sharpening filter information and adaptive parameter information. This signalling can be done for different parts or the video content. Thus, the adaptive parameter information and/or the sharpening filter information can be added at a block level for each prediction block, for an arbitrary or regular region of the frame, at a frame level, at a GOP (group of pictures) level, at a PPS (picture parameter set) level or at an SPS (sequence parameter set) level. The granularity of the adaptive parameter information and/or sharpening filter information can vary.

An embodiment of the adaptive sharpening filter 409 is shown in FIG. 3. The adaptive sharpening filter 300 shown in FIG. 3 is preferably a non-linear filter. The usage of a non-linear sharpening filter, instead of a linear filter, is preferable for removing artifacts caused by re-sampling filter and quantization of the reference frame. The choice of a non-linear filter can reduce the number of adaptive parameters of the adaptive sharpening filter 300. In particular, the non-linear filter can utilize only one adaptive parameter, so that the signalling overhead of the encoded video bit stream is reduced. While the present disclosure also covers the use of more than one adaptive parameter to control the adaptive sharpening filter, an adaptive sharpening filter utilizing only one adaptive parameter is a particularly advantageous embodiment.

Particularly, the adaptive sharpening filter 300 comprises an edge map calculation unit 301, 302, a blurring filter 304, a high-pass filter 305, a scaling unit 306 and a warping unit 307.

The edge map calculation unit 301, 302 is adapted to generate an edge map of a source block, said source block being the prediction block stored in the buffer 408 and being referred to as upsampled base layer block in FIG. 3. The blurring filter 304 is adapted to blur the edge map of the source block. The high-pass filter 305 is adapted to generate, by high-pass filtering the blurred edge map, a derivative vector (d2x, d2y) for each position of the source block. The scaling unit 306 is adapted to generate a displacement vector (wx, wy) by scaling the derivative vector (d2x, d2y) with a sharpening strength coefficient k. The warping unit 307 is adapted to warp the prediction block based on the displacement vector (wx, wy).

Thereby, the adaptive parameter controlling the adaptive sharpening filter 300 is the sharpening strength coefficient k. The adaptive sharpening filter 300 shown in FIG. 3 is an embodiment of the present disclosure with only one adaptive parameter.

The edge map calculation unit 301, 302 can comprise a gradient vector unit 301 adapted to generate a gradient vector (dx, dy) for each position of the source block, and a gradient vector length unit 302 adapted to calculate the length of the gradient vector (dx, dy) of each position so as to generate the edge map of the source block. Thereby, this structure allows for the generation of an edge map that can be further processed by the blurring filter, the high-pass filter and the scaling unit to generate the warping displacement vector.

The gradient vector can be obtained by taking the first derivative separately for dx and dy, i.e. separately for both a horizontal and a vertical direction of the source block, by applying a corresponding Prewitt filter in accordance with the following equations:

$$dx = \begin{bmatrix} 1 & 0 & -1 \\ 1 & 0 & -1 \\ 1 & 0 & -1 \end{bmatrix} * img$$

$$dy = \begin{bmatrix} 1 & 1 & 1 \\ 0 & 0 & 0 \\ -1 & -1 & -1 \end{bmatrix} * img$$

The edge map can be obtained by the gradient vector length unit 302 by calculating the gradient vector length in accordance with the following equation:

$$abs = \sqrt{dx^2 + dy^2}$$

Advantageously, the sharpening filter 300 comprises a clipping unit 303 adapted to clip the edge map of the source block, said clipping unit 303 being located between the edge map calculation unit 301, 302 and the blurring filter 304. Thereby, the clipping of the edge map with thresholds is advantageous in that it prevents the processing of extremely high and low values of warping vectors.

The step of blurring of the clipped edge map can be obtained by a blurring filter 304 in form of a Gaussian filter that can be defined as follows:

$$G = \begin{bmatrix} 1 & 4 & 7 & 4 & 1 \\ 4 & 16 & 26 & 16 & 4 \\ 7 & 26 & 41 & 26 & 7 \\ 4 & 16 & 26 & 16 & 4 \\ 1 & 4 & 7 & 4 & 1 \end{bmatrix}$$

The high-pass filter is used to obtain, separately for d2x and d2y, the second derivative, for example according to the followings:

$$d^2x = [1 \ 0 \ -1]$$

$$d^2y = \begin{bmatrix} 1 \\ 0 \\ -1 \end{bmatrix}$$

The displacement vector (wx,wy) is obtained by scaling the second derivative vector (d2x, d2y) with the coefficient k, wherein the coefficient k can be considered as sharpening strength, according to the following equations:

$$wx=k*d^2x$$

$$wy=k*d^2y$$

The warping unit 307 includes an interpolation filter that is e.g. a bi-linear interpolation filter. The warping unit 307 uses the displacement vector generated by the scaling unit 306.

A subtracting unit 308 is adapted to build the difference between the sharpened prediction block generated by the warping unit 307 and the original block stored in the buffer 401, said original block corresponding to the block to be encoded. The subtracting unit 308 in fact generates the residual block. The adaptive sharpening filter 300, or the control unit 410 controlling the adaptive sharpening filter 300, is adapted to find the optimum sharpening strength k, for example, by minimizing the residual block or by a cost criterion based e.g. on the rate-distortion.

Coming back to FIG. 4, the video coder 400 is configured to select, during an optimization, the most optimal adaptive parameter of the adaptive sharpening filter 409, and the decision about applying or bypassing the adaptive sharpening filter for inter layer prediction could be done by minimum of prediction error or by cost (rate/distortion) criterion.

The video coder 400 particularly presents a processing flow that can be as follows:

The prediction block is obtained by reconstructing and upsampling a base layer frame.

The edge map of the prediction block is generated, for example, by the edge map calculation unit 301, 302 of the adaptive sharpening filter. Alternatively, the edge map can be generated by the unit 411 of the edge strength estimation unit 411, 412, said unit 411 being located outside of the adaptive sharpening filter 409.

The sharpening filter adaptation, i.e. the choice of the adaptive parameter, is performed. Advantageously, the generated edge map could be used for the filtering adaptation.

A decision is taken e.g. by the control unit 410 about the prediction type, the prediction type consisting in applying or bypassing the adaptive sharpening filter 409. The decision can be based on a prediction quality metric, for example, a minimum of the residual error, or on a cost criterion, for example, a rate/distortion based cost criterion.

The already generated edge map is used for estimating an edge strength in the prediction block. The edge strength is estimated e.g. by averaging the values of the edge map of the prediction block.

The estimated edge strength is used as context switch for CABAC and the prediction type consisting in applying or bypassing the adaptive sharpening filter 409 is encoded as sharpening filter information. In other words, the prediction type is compressed using CABAC with context switch controlled by edge strength. The context switch can be performed by comparison of the estimated edge strength with a given threshold. If the estimated edge strength is above the threshold then a first context is used. If the estimated edge strength is below the threshold, then a second context is used. In advantageous embodiments more than two levels of edge strength and more corresponding CABAC contexts may be used.

If the adaptive sharpening filter 409 is applied, then the sharpening strength is encoded as adaptive parameter information.

Coefficients are calculated for the residual block by the transform and quantization unit 404, and the coefficients are encoded by the encoding unit 405.

FIG. 5 shows a video decoder according to an embodiment of the present disclosure, and particularly a video decoder 500 for inter layer predictive decoding.

The video decoder 500 is suitable for decoding an encoded video bit stream obtained by predictive coding of an original block of an original frame based on a prediction block obtained from a reconstructed reference frame. The video decoder 500 comprises a decoding unit configured to reconstruct the reference frame from the encoded video bit stream, a buffer 514 configured to store the prediction block obtained from the reconstructed reference frame, and an adaptive sharpening filter 507 configured to apply a spatial adaptive sharpening filtering to the prediction block.

In the context of the inter layer predictive decoding, the original frame is a frame of the enhancement layer, and the reference frame is a frame of a reconstructed base layer. The video decoder 500 further on comprises an upsampling filter 513 configured to upsample the reconstructed base layer, i.e. to upsample the reference frame. The prediction block stored in the buffer 514 is a block of the upsampled reference frame.

The video decoder 500 further on comprises a decoding unit 512 configured to extract, from the encoded video bit stream, sharpening filter information reflecting at least one of a selective bypass of the adaptive sharpening filter 507 and a selective application of the adaptive sharpening filter 507. The video decoder 500 comprises a control unit 508 configured to control the at least one of the selective bypass and the selective application depending on the extracted sharpening filter information. The sharpening filter information may be in the form of a sharpening applied/bypass flag. Alternatively, the adaptive sharpening filter 507 may be always applied.

Particularly, the decoding unit 512 is configured to decode the sharpening filter information according to a CABAC. The video decoder comprises an edge strength estimation unit 510, 511 configured to estimate an edge strength in the prediction block. The video decoder comprises a CABAC context switch 509 configured to select a context of the CABAC depending on the estimated edge strength. Particularly, the edge strength estimation unit 510, 511 can comprise a first unit 511 for building an edge map of the prediction block, and a second unit 510 for estimating an edge strength based on the edge map.

The adaptive sharpening filter 507 is particularly configured to be controlled by at least one adaptive parameter. Further on the video decoder comprises a decoding unit 506 configured to extract, from the encoded video bit stream and particularly from the encoded enhancement layer bit stream, adaptive parameter information about a parameter value of the adaptive parameter. The control unit 508 is configured to control the adaptive sharpening filter 507 according to the extracted adaptive parameter information.

The adaptive sharpening filter 507 of the video decoder 500 preferably presents the same structure and the same units as the adaptive sharpening filter 300 shown in FIG. 3, with the following differences. A difference between these two filters is that the adaptive sharpening filter 507 preferably does not comprise the subtracting unit 308. Further on, in the video decoder 500, the adaptive parameter, i.e. the coefficient k, is not set by means of the subtracting unit 308 and the minimization of the residual block. Instead, the adaptive parameter is set in the video decoder 500 preferably depending on the adaptive parameter information extracted as signalling data from the encoded bit stream.

The video decoder 500 may comprise further units that are a decoding unit 501 for decoding the received encoded enhancement video bit stream and to correspondingly obtain quantized residual transform coefficients. The quantized residual transform coefficients are fed to an inverse quantization and inverse transform unit 502 to generate a residual block stored in a buffer 503. The residual block is added by an adder 504 to the output of the controlling unit 508. Depending on the extracted sharpening filter information, the residual block is then added to the prediction block stored in the buffer 514, or to the sharpened prediction block outputted by the adaptive sharpening filter 507. The output of the adder 504 is then a reconstructed block of the enhancement layer.

The video decoder 500 particularly presents a processing flow that can be as follows:
  The prediction block is obtained by reconstructing and upsampling a base layer frame.
  The edge map of the prediction block is generated, for example, by the edge map calculation unit 301, 302 of the adaptive sharpening filter. Alternatively, the edge map can be generated by the unit 511 of the edge strength estimation unit 511, 512, said unit 511 being located outside of the adaptive sharpening filter 509.
  The generated edge map is used for estimating an edge strength in the prediction block. The edge strength is estimated e.g. by averaging the values of the edge map of the prediction block.
  The estimated edge strength is used as context switch for CABAC and the prediction type consisting in applying or bypassing the adaptive sharpening filter 507, i.e. the sharpening filter information, is decoded. The context switch can be performed by comparison of the estimated edge strength with a given threshold. If the estimated edge strength is above the threshold then a first context is used. If the estimated edge strength is below the threshold, then a second context is used. In advantageous embodiments more than two levels of edge strength and more corresponding CABAC contexts may be used.
  If, based on the sharpening filter information, it is determined that the adaptive sharpening filter 507 is applied, then the sharpening strength, i.e. the adaptive parameter information, is decoded. The adaptive sharpening filter 507 is applied with the decoded sharpening strength. The already generated edge map could be used for sharpening to save resources.
  The residual block is decoded by means of the units 501, 502, 503. Depending on the sharpening filter information, the residual block is added to the prediction block or to the sharpened prediction block to obtain a reconstructed block of the enhancement layer.

FIG. 6 shows a video coder 600 for inter frame predictive coding according to an embodiment of the present disclosure.

The video coder 600 is suitable for predictive coding, into an encoded video bit stream, of an original block of an original frame based on a prediction block obtained from a reference frame. The video coder 600 comprises a buffer 601 configured to store the original block, a buffer 608 configured to store the prediction block, and an adaptive sharpening filter 609 configured to apply a spatial adaptive sharpening filtering to the prediction block.

In the context of the inter frame predictive coding of video content comprising subsequent frames, the original frame is one of the subsequent frames and the reference frame is one of the reconstructed subsequent frames. The video coder 600 comprises a buffer 606 configured to store a reference block of the reference frame. The video coder 600 comprises a motion estimation unit 616 configured to obtain a motion vector reflecting motion between the reference block and the original block, and a motion compensation unit 607 configured to generate the prediction block from the reference block based on the motion vector.

The remaining structure and units of the video coder 600 are similar to the structure and units of the video coder 400. The video coder 600 comprises a control unit 610 similar to the control unit 410. The video coder 600 comprises an encoding unit 614 similar to the encoding unit 414. The video coder 600 comprises an edge strength estimation unit 611, 612 similar to the edge strength estimation unit 411, 412, and a CABAC context switch 613 similar to the CABAC context switch 413. The video coder 600 comprises an encoding unit 615 similar to the encoding unit 415. The video also similarly comprises a subtracting unit 602 for generating the residual block, a buffer 603 for the residual block, a transform and quantization unit 604 and an encoding unit 605 for coding quantized coefficients A difference between the video coder 600 and the video coder 400 is that, instead of an upsampled base layer frame, a previously encoded frame is used as a reference frame. Further on, a motion compensation is applied for obtaining the prediction block. The motion compensation advantageously comprises a motion interpolation.

Alternatively to the structure of the video coder 400, the edge strength estimation unit 611, 612 can estimate the edge strength of the reference block instead of estimate the edge strength of the prediction block.

Also, the adaptive sharpening filter of FIG. 3 can be used as adaptive sharpening filter 609 of the video coder 600. While the edge map calculation unit 301, 302 of the video coder 400 is adapted to generate an edge map of a source block being the prediction block, the source block of the adaptive sharpening filter of the video coder 600 can be either the prediction block or alternatively the reference block. According to this alternative, the displacement vector (wx, wy) is derived from the reference block and the warping is then applied to the prediction block using the obtained displacement vector, which is advantageous in that is saves computational resources on the coder side.

Beside these differences and alternatives between the video coder 400 and 600, the further aspects described above with reference to the video coder 400 also apply to the video coder 600.

The video coder 600 particularly presents a processing flow that can be as follows:
  The motion vector is obtained by a motion estimation procedure.
  The edge map of the reference block is generated.
  The sharpening filter adaptation, i.e. the choice of the adaptive parameter, is performed. Advantageously, the generated edge map could be used for the filtering.
  A decision is taken e.g. by the control unit 610 about the prediction type, the prediction type consisting in applying or bypassing the adaptive sharpening filter 609. The decision can be based on a prediction quality metric, for example, a minimum of the residual error, or on a cost criterion, for example, a rate/distortion based cost criterion.

The already generated edge map is used for estimating an edge strength of the reference block. The edge strength is estimated e.g. by averaging the values of the edge map of the reference block.

The estimated edge strength is used as context switch for CABAC and the prediction type consisting in applying or bypassing the adaptive sharpening filter 609 is encoded as sharpening filter information. The context switch can be performed by comparison of the estimated edge strength with a given threshold. If the estimated edge strength is above the threshold then a first context is used. If the estimated edge strength is below the threshold, then a second context is used. In advantageous embodiments more than two levels of edge strength and more corresponding CABAC contexts may be used.

If the adaptive sharpening filter 609 is applied, then the sharpening strength is encoded as adaptive parameter information.

Coefficients are calculated for the residual block by the transform and quantization unit 604, and the coefficients are encoded by the encoding unit 605.

FIG. 7 shows a video decoder according to an embodiment of the present disclosure, and particularly a video decoder 700 for inter frame predictive decoding.

The video decoder 700 is suitable for decoding an encoded video bit stream obtained by predictive coding of an original block of an original frame based on a prediction block obtained from a reconstructed reference frame. The video decoder 700 comprises a decoding unit configured to reconstruct the reference frame from the encoded video bit stream, a buffer 714 configured to store the prediction block obtained from the reconstructed reference frame, and an adaptive sharpening filter 707 configured to apply a spatial adaptive sharpening filtering to the prediction block.

In the context of decoding an encoded video bit stream obtained by inter frame predictive coding of video content comprising subsequent frames, the original frame is one of the subsequent frames, and the reference frame is one of reconstructed subsequent frames. The video decoder 700 comprises a buffer 715 configured to store a reference block of the extracted reference frame, a decoding unit 716 configured to extract, from the encoded video bit stream, a motion vector reflecting motion between the reference block and the original block, and a motion compensation unit 713 configured to generate the prediction block from the reference block based on the motion vector.

The video decoder 700 further on comprises a decoding unit 712 configured to extract, from the encoded video bit stream, sharpening filter information reflecting at least one of a selective bypass of the adaptive sharpening filter 707 and a selective application of the adaptive sharpening filter 707. The video decoder 700 comprises a control unit 708 configured to control the at least one of the selective bypass and the selective application depending on the extracted sharpening filter information. The sharpening filter information may be in the form of a sharpening applied/bypass flag. Alternatively, the adaptive sharpening filter 707 may be always applied.

Particularly, the decoding unit 712 is configured to decode the sharpening filter information according to a CABAC. The video decoder comprises an edge strength estimation unit 710, configured to estimate an edge strength based on edge map calculated by unit 711 using the reference block stored in the buffer 715. The video decoder comprises a CABAC context switch 709 configured to select a context of the CABAC depending on the estimated edge strength. Particularly, the edge strength estimation unit 710, 711 can comprise a first unit 711 for building an edge map of the reference block, and a second unit 710 for estimating an edge strength based on the edge map.

The adaptive sharpening filter 707 is particularly configured to be controlled by at least one adaptive parameter. Further on the video decoder comprises a decoding unit 706 configured to extract, from the encoded video bit stream, adaptive parameter information about a parameter value of the adaptive parameter. The control unit 708 is configured to control the adaptive sharpening filter 707 according to the extracted adaptive parameter information.

The adaptive sharpening filter 707 of the video decoder 700 preferably presents the same structure as the adaptive sharpening filter 609 of the video coder 600, with the following differences. A difference between these two filters is that the adaptive sharpening filter 707 preferably does not comprise the subtracting unit 308. Further on, in the video decoder 700, the adaptive parameter, i.e. the coefficient k, is not set by means of the subtracting unit 708 and the minimization of the residual block. Instead, the adaptive parameter is set in the video decoder 700 preferably depending on the adaptive parameter information extracted as signalling data from the encoded bit stream.

The video decoder 700 may comprise further units that are a decoding unit 701 for decoding the received encoded video bit stream and to correspondingly obtain quantized residual transform coefficients. The quantized residual transform coefficients are fed to an inverse quantization and inverse transform unit 702 to generate a residual block stored in a buffer 703. The residual block is added by an adder 704 to the output of the controlling unit 708. Depending on the extracted sharpening filter information, the residual block is then added to the prediction block stored in the buffer 714, or to the sharpened prediction block outputted by the adaptive sharpening filter 707. The output of the adder 704 is then a reconstructed block of a given frame.

The video decoder 700 particularly presents a processing flow that can be as follows:

The motion vector is obtained as signalling data from the encoded video bit stream.

An edge map is generated from the reference block.

The generated edge map is used for estimating an edge strength of the reference block. The edge strength is estimated e.g. by averaging the values of the edge map.

The estimated edge strength is used as context switch for CABAC and the prediction type consisting in applying or bypassing the adaptive sharpening filter 707, i.e. the sharpening filter information, is decoded. The context switch can be performed by comparison of the estimated edge strength with a given threshold. If the estimated edge strength is above the threshold then a first context is used. If the estimated edge strength is below the threshold, then a second context is used. In advantageous embodiments more than two levels of edge strength and more corresponding CABAC contexts may be used.

If, based on the sharpening filter information, it is determined that the adaptive sharpening filter 707 is applied, then the sharpening strength, i.e. the adaptive parameter information, is decoded. The adaptive sharpening filter 707 is applied with the decoded sharpening strength. The already generated edge map could be used for sharpening to save resources.

The residual block is decoded by means of the units 701, 702, 703. Depending on the sharpening filter information, the residual block is added to the prediction block or to the sharpened prediction block to obtain a reconstructed block of a given frame.

Figure 8:
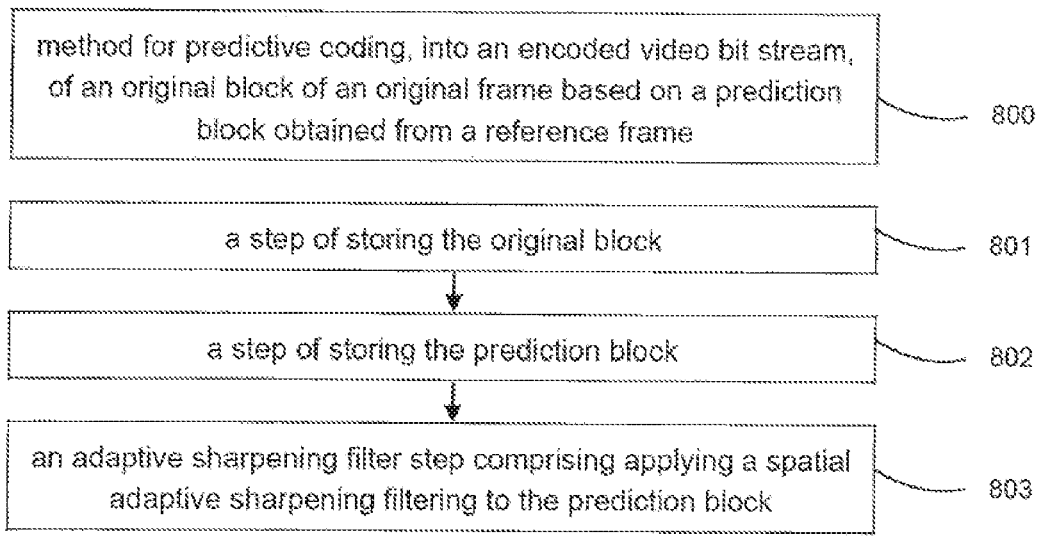
FIG. 8 shows a video coding method according to an embodiment of the present disclosure.

FIG. 8 shows a video coding method according to an embodiment of the present disclosure.

The video coding method is a method 800 for predictive coding, into an encoded video bit stream, of an original block of an original frame based on a prediction block obtained from a reference frame.

The method comprises storing 801 the original block.

The method comprises storing 802 the prediction block.

The method comprises an adaptive sharpening filter step 803 comprising applying a spatial adaptive sharpening filtering to the prediction block.

Figure 9:
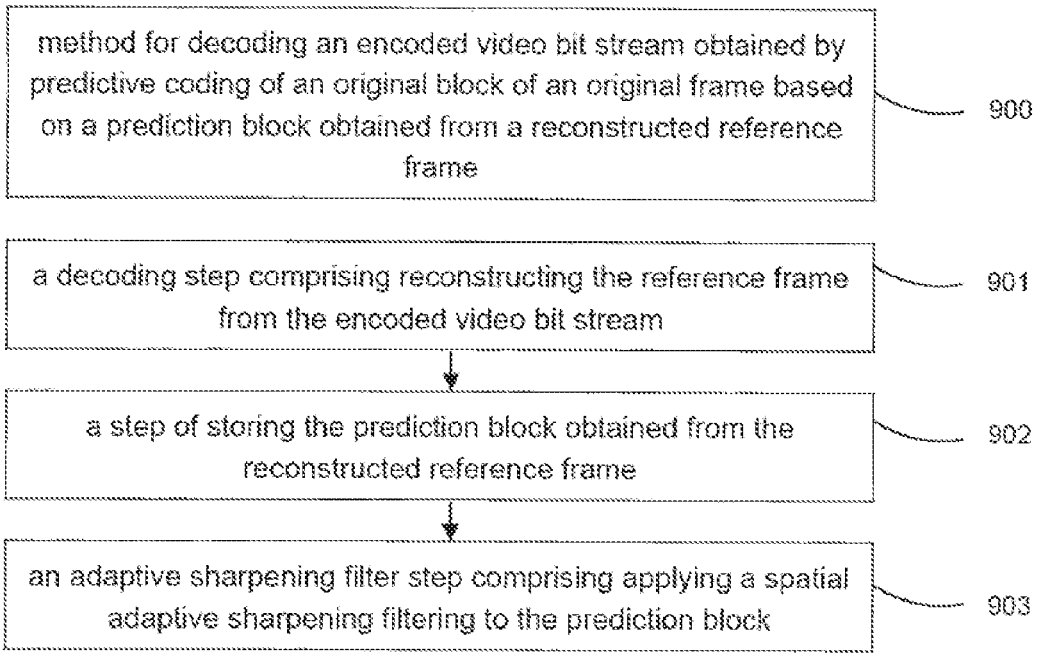
FIG. 9 shows a video decoding method according to an embodiment of the present disclosure.

FIG. 9 shows a video decoding method according to an embodiment of the present disclosure. The video coding method is a method 900 for decoding an encoded video bit stream obtained by predictive coding of an original block of an original frame based on a prediction block obtained from a reconstructed reference frame.

The method comprises a decoding step 901 comprising reconstructing the reference frame from the encoded video bit stream.

The method comprises a step 902 of storing the prediction block obtained from the reconstructed reference frame.

The method comprises an adaptive sharpening filter step 903 comprising applying a spatial adaptive sharpening filtering to the prediction block.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfil the functions of several entities or items recited in the claims. The mere fact that certain measures are recited in the mutual different dependent claims does not indicate that a combination of these measures cannot be used in an advantageous implementation.

What is claimed is:

1. A video coder for predictive coding of original blocks of an original frame into an encoded video bit stream based on prediction blocks obtained from a reference frame, the video coder comprising:
   a first buffer configured to store at least one of the original blocks,
   a second buffer configured to store at least one of the prediction blocks,
   a sharpening filter configured to apply sharpening filtering to the at least one prediction block based on sharpening filter information such that the at least one prediction block may be filtered differently than other prediction blocks obtained from the reference frame,
   a controller configured to selectively apply the sharpening filtering from the sharpening filter to the at least one prediction block based on a value of the sharpening filter information,
   a context-adaptive binary arithmetic coding (CABAC) context switch configured to select a context of the CABAC, depending on a value of an edge strength parameter,
   an encoder configured to
      (i) respond to the controller to add to the encoded video bit stream the sharpening filter information reflecting at least one of the selective bypass and the selective application of the sharpening filter, and
      (ii) respond to the CABAC context switch to encode the sharpening filter information using the selected context, and
   an edge strength estimator configured to estimate an edge strength of image content in the at least one prediction block or a reference block of the reference frame, wherein the estimated edge strength provides information for determining the value of the edge strength parameter.

2. The video coder according to claim 1, wherein, the sharpening filter is further configured to apply a different sharpening filtering to each of the plurality of prediction blocks.

3. The video coder according to claim 1, wherein the predictive coding is for inter layer predictive coding of scalable video content comprising a base layer and at least one enhancement layer, and wherein the original frame is a frame of at least one enhancement layer, and the reference frame is a frame of a reconstructed base layer;
   wherein the video coder further comprises:
   an upsampling filter configured to upsample the reference frame, wherein at least one of the prediction blocks is a block of the upsampled reference frame.

4. The video coder according to claim 1, wherein the predictive coding is for inter frame predictive coding of video content comprising subsequent frames, wherein the original frame is one of the subsequent frames, and the reference frame is one of reconstructed subsequent frames;
   wherein the video coder further comprises:
   a third buffer configured to store the reference block of the reference frame,
   a motion estimator configured to obtain a motion vector reflecting motion between the reference block and the original block, and
   a motion compensation unit configured to generate at least one of the prediction blocks from the reference block based on the motion vector.

5. The video coder according to claim 1, wherein the controller is further configured to control selectively applying the sharpening filtering to the at least one prediction block based on a minimization of a residual block, wherein the residual block is the difference between one of the original blocks and one of the prediction blocks, or based on a rate distortion optimization.

6. The video coder according to claim 1, wherein the sharpening filter is further configured to be controlled by at least one adaptive parameter, and
   wherein the controller is further configured to determine a parameter value of the adaptive parameter and supply the determined parameter value to the adaptive sharpening filter, and
   the encoder is further configured to add to the encoded video bit stream adaptive parameter information about the determined parameter value of the adaptive parameter.

7. The video coder according to claim 6, wherein the controller is further configured to supply different parameter values for the adaptive parameter and to select one of the different parameter values based on a minimization of a residual block, wherein the residual block is the difference between one of the original blocks and one of the prediction blocks, or based on a rate distortion optimization.

8. The video coder according to claim 6, wherein the sharpening filter is a non-linear filter configured to be controlled by a single adaptive parameter.

9. The video coder according to claim 6, wherein the sharpening filter comprises:
- an edge map calculator adapted to generate an edge map of at least one of the source blocks, wherein the at least one source block is at least one of the prediction blocks or the reference block of the reference frame,
- a blurring filter adapted to blur the edge map of the at least one source block,
- a high-pass filter adapted to generate, by high-pass filtering the blurred edge map, a derivative vector for each position of the at least one source block,
- a scaling unit adapted to generate a displacement vector by scaling the derivative vector with a sharpening strength coefficient, and
- a warping unit adapted to warp the at least one prediction block based on the displacement vector,
- wherein the adaptive parameter includes the sharpening strength coefficient.

10. The video coder according to claim 6, wherein the adaptive parameter information is added at a block level for each prediction block, for an arbitrary or regular region of the frame, at a frame level, at a group of pictures (GOP) level, at a picture parameter set (PPS) level or at a sequence parameter set (SPS) level.

11. A method for predictive coding of original blocks of an original frame into an encoded video bit stream, based on prediction blocks obtained from a reference frame, the method comprising:
- storing at least one of the original blocks,
- storing at least one of the prediction blocks,
- selectively applying sharpening filtering to the at least one prediction block based on sharpening filter information such that the at least one prediction block may be filtered differently than other prediction blocks obtained from the reference frame,
- selecting a context of a context-adaptive binary arithmetic coding (CABAC) depending on a value of an edge strength parameter,
- adding to the encoded video bit stream the sharpening filter information reflecting the at least one of the selective bypass and the selective application of the sharpening filter, wherein the added sharpening filter information is encoded according to the selected context of the CABAC, and
- estimating an edge strength of image content in the at least one prediction block or a reference block of the reference frame, wherein the estimated edge strength provides information for determining the value of the edge strength parameter.

12. A video decoder for decoding an encoded video bit stream obtained by predictive coding of original blocks of an original frame based on prediction blocks obtained from a reference frame reconstructed from the encoded video bit stream, the video decoder comprising:
- a decoder configured to reconstruct the reference frame from the encoded video bit stream,
- a first buffer configured to store at least one of the prediction blocks obtained from the reconstructed reference frame,
- a sharpening filter configured to selectively apply sharpening filtering to the at least one of the prediction blocks based on sharpening filter information such that the at least one prediction block may be filtered differently than other prediction blocks obtained from the reference frame,
- wherein the decoder is further configured to extract, from the encoded video bit stream, the sharpening filter information,
- a controller configured to control the selective application of the sharpening filtering by the sharpening filter, depending on the sharpening filter information extracted from the encoded video bit stream by the decoder,
- a context-adaptive binary arithmetic coding (CABAC) context switch configured to select a context of the CABAC, depending on a value of an edge strength parameter,
- wherein the decoder is further configured to decode the extracted sharpening filter information in response to the CABAC context switch, and
- an edge strength estimator configured to estimate an edge strength of image content in the at least one of the prediction blocks or a reference block of the reference frame, wherein the estimated edge strength provides information for determining the value of the edge strength parameter.

13. The video decoder according to claim 12, wherein the decoder is further configured for decoding the encoded video bit stream obtained by inter layer predictive coding of scalable video content comprising a base layer and at least one enhancement layer, wherein the original frame is a frame of an enhancement layer, and the reference frame is a frame of a reconstructed base layer,
wherein the video decoder further comprises:
an upsampling filter configured to upsample the reconstructed reference frame, wherein at least one of the prediction blocks is a block of the upsampled reference frame.

14. The video decoder according to claim 12, wherein the decoder is further configured for decoding the encoded video bit stream obtained by inter frame predictive coding of video content comprising subsequent frames, wherein the original frame is one of the subsequent frames, and the reference frame is one of reconstructed subsequent frames, and
the video decoder further comprising:
a second buffer configured to store the reference block of the extracted reference frame,
the decoder is further configured to extract, from the encoded video bit stream, a motion vector reflecting motion between the reference block and at least one of the original blocks, and
a motion compensation unit configured to generate the at least one of the prediction blocks from the reference block based on the motion vector.

15. The video decoder according to claim 12, wherein the sharpening filter is further configured to be controlled by at least one adaptive parameter,
the decoder is further configured to extract, from the encoded video bit stream, adaptive parameter information about a parameter value of the adaptive parameter, and
the controller is further configured to control the sharpening filter according to the extracted adaptive parameter information.

16. The video decoder according to claim 15, wherein the sharpening filter is a non-linear filter configured to be controlled by a single adaptive parameter.

17. The video decoder according to claim 15, wherein the sharpening filter comprises:
- an edge map calculator adapted to generate an edge map of at least one of the source blocks, wherein the at least one source block is the at least one of the prediction blocks or the reference block of the reference frame,
- a blurring filter adapted to blur the edge map of the at least one source block,
- a high-pass filter adapted to generate, by high-pass filtering the blurred edge map, a derivative vector for each position of the at least one source block,
- a scaling unit adapted to generate a displacement vector by scaling the derivative vector with a sharpening strength coefficient, and
- a warping unit adapted to warp the at least one prediction block based on the displacement vector,
- wherein the adaptive parameter includes the sharpening strength coefficient.

18. The video decoder according to claim 15, wherein the adaptive parameter information is extracted at a block level for each prediction block, for an arbitrary or regular region of the frame, at a frame level, at a group of pictures (GOP) level, at a picture parameter set (PPS) level or at a sequence parameter set (SPS) level.

19. A method for decoding an encoded video bit stream obtained by predictive coding of original blocks of an original frame based on prediction blocks obtained from a reference frame, the method comprising:
- reconstructing the reference frame from the encoded video bit stream,
- storing at least one of the prediction blocks obtained from the reconstructed reference frame,
- selectively applying sharpening filtering to the at least one of the prediction blocks based on sharpening filter information extracted from the encoded video bit stream such that the at least one prediction block may be filtered differently than other prediction blocks obtained from the reference frame,
- selecting a context of a context-adaptive binary arithmetic coding (CABAC), depending on a value of an edge strength parameter,
- decoding the extracted sharpening filter information in response to the context of the CABAC,
- estimating an edge strength of image content in the at least one of the prediction blocks or a reference block of the reference frame, wherein the estimated edge strength provides information for determining the value of the edge strength parameter.

20. A non-transitory computer readable storage medium having stored thereon a computer program comprising a program code, which when executed by a processor, causes the processor to perform the method according to claim 11.

21. A non-transitory computer readable storage medium having stored thereon a program comprising a program code, which when executed by a processor, causes the processor to perform the method according to claim 19.

* * * * *

UNITED STATES PATENT AND TRADEMARK OFFICE
CERTIFICATE OF CORRECTION

PATENT NO. : 10,863,205 B2
APPLICATION NO. : 15/934628
DATED : December 8, 2020
INVENTOR(S) : Sychev et al.

Page 1 of 1

It is certified that error appears in the above-identified patent and that said Letters Patent is hereby corrected as shown below:

In the Claims

Claim 6: Column 20, Line 59: "the determined parameter value to the adaptive sharp-" should read -- the determined parameter value to the sharp --.

Signed and Sealed this
Fifth Day of April, 2022

Drew Hirshfeld
*Performing the Functions and Duties of the
Under Secretary of Commerce for Intellectual Property and
Director of the United States Patent and Trademark Office*